US011336774B2

(12) United States Patent
Iida et al.

(10) Patent No.: US 11,336,774 B2
(45) Date of Patent: May 17, 2022

(54) INFORMATION PROCESSING APPARATUS, METHOD, AND PRODUCT COMPARING NEW AND OLD VERSIONS OF SUBMITTED DATA TO SPECIFY INSPECTION AFFECTED BY DIFFERENCE

(71) Applicant: CANON KABUSHIKI KAISHA, Tokyo (JP)

(72) Inventors: Toshihiko Iida, Ibaraki (JP); Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/338,016

(22) Filed: Jun. 3, 2021

(65) Prior Publication Data
US 2021/0385339 A1    Dec. 9, 2021

(30) Foreign Application Priority Data

Jun. 9, 2020    (JP) .............................. JP2020-100276

(51) Int. Cl.
| H04N 1/00 | (2006.01) |
| G06T 7/00 | (2017.01) |
| G06F 3/12 | (2006.01) |

(52) U.S. Cl.
CPC ....... *H04N 1/00079* (2013.01); *G06F 3/1211* (2013.01); *G06F 3/1256* (2013.01); *G06T 7/001* (2013.01); *H04N 1/00005* (2013.01); *H04N 1/00039* (2013.01); *H04N 1/0044* (2013.01); *G06T 2207/30144* (2013.01)

(58) Field of Classification Search
None
See application file for complete search history.

(56) References Cited

FOREIGN PATENT DOCUMENTS

| JP | 2005-248578 A |   | 9/2005 |   |
|----|---------------|---|--------|---|
| JP | 2021089605 A  | * | 6/2021 |   |
| JP | 2021092847 A  | * | 6/2021 | ............. G06Q 50/10 |
| JP | 2021179863 A  | * | 11/2021 |   |
| JP | 2021193520 A  | * | 12/2021 |   |

\* cited by examiner

*Primary Examiner* — Scott A Rogers
(74) *Attorney, Agent, or Firm* — Canon U.S.A., Inc. IP Division

(57) ABSTRACT

An information processing apparatus configured to, on the basis of submitted data, generate a quality report for a printed material inspected by an inspection apparatus is provided. The apparatus comprises a first specifying unit that, when the submitted data is a new version and an old version of the submitted data is present, specifies a difference by comparing the new version of the submitted data with the old version of the submitted data; a second specifying unit that, on the basis of the difference, specifies an inspection for which an inspection result will be affected by the difference; and a creation unit that creates a quality report which makes it possible to distinguish, among inspection results received from the inspection apparatus, an inspection result for the inspection that will be affected from another inspection result.

13 Claims, 33 Drawing Sheets

FIG. 4

| | |
|---|---|
| BOOT LOADER | ~401 |
| OPERATING SYSTEM | ~402 |
| NETWORK CONTROL PROGRAM | ~403 |
| DATA RECEIVING PROGRAM | ~404 |
| DATA SENDING PROGRAM | ~405 |
| PRINT JOB MANAGEMENT PROGRAM | ~406 |
| PRINT DATA MANAGEMENT PROGRAM | ~407 |
| MEDIA MANAGEMENT PROGRAM | ~408 |
| INSPECTION PROGRAM | ~409 |

FIG. 5

| | |
|---|---|
| BOOT LOADER | ~501 |
| OPERATING SYSTEM | ~502 |
| NETWORK CONTROL PROGRAM | ~503 |
| WEB SERVER | ~504 |
| WORKFLOW CONTROL PROGRAM | ~505 |
| SUBMISSION SYSTEM PROGRAM | ~506 |
| SUBMITTED DATA MANAGEMENT PROGRAM | ~507 |
| QUALITY REPORT CREATION PROGRAM | ~508 |

FIG. 6

| | |
|---|---|
| BOOT LOADER | ~601 |
| OPERATING SYSTEM | ~602 |
| NETWORK CONTROL PROGRAM | ~603 |
| WEB BROWSER | ~604 |
| PRINT DATA CREATION PROGRAM | ~605 |
| QUALITY REQUIREMENT CREATION PROGRAM | ~606 |
| PRINT SETTING CREATION PROGRAM | ~607 |
| SUBMITTED DATA SENDING PROGRAM | ~608 |
| QUALITY REPORT RECEIVING PROGRAM | ~609 |

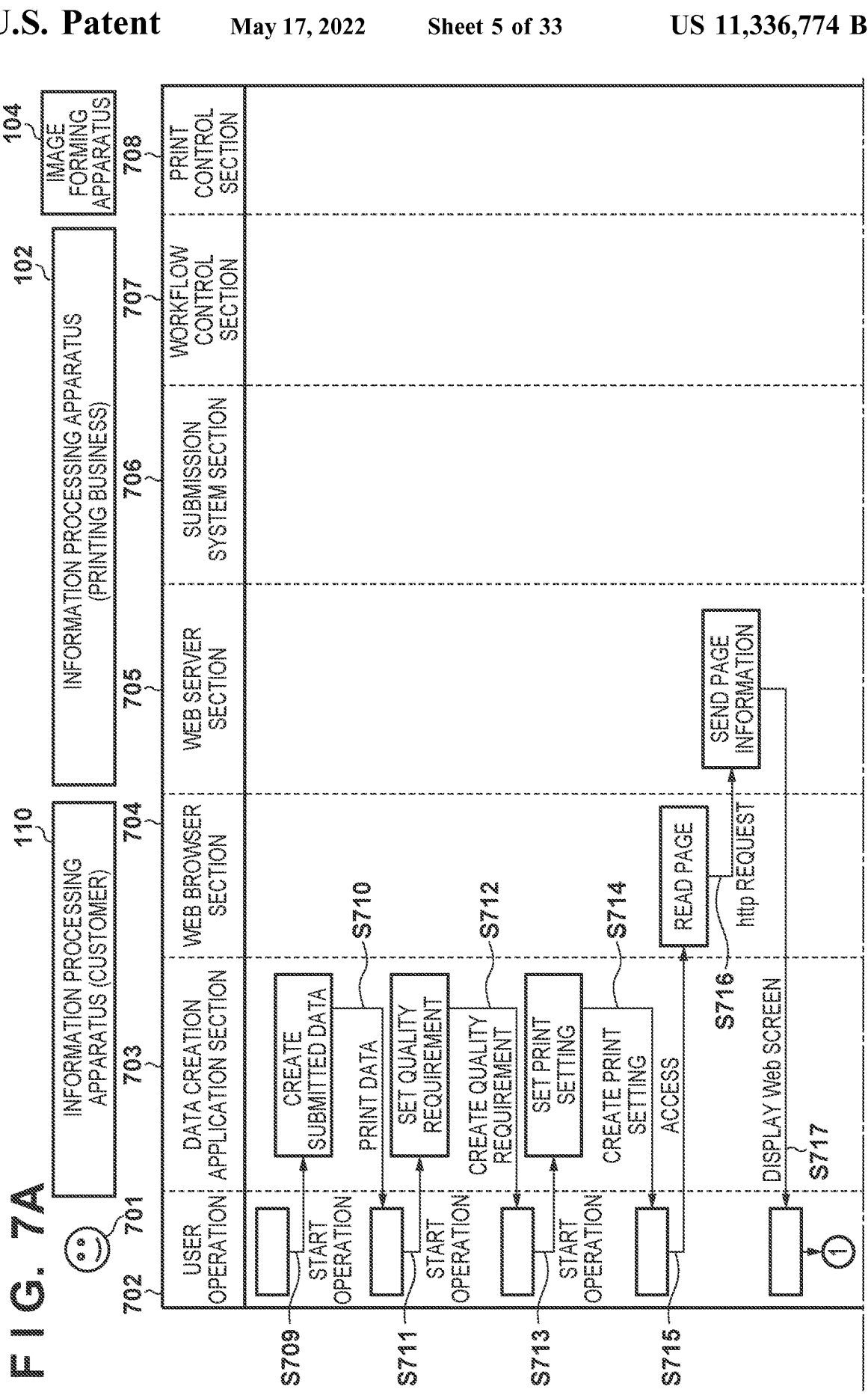

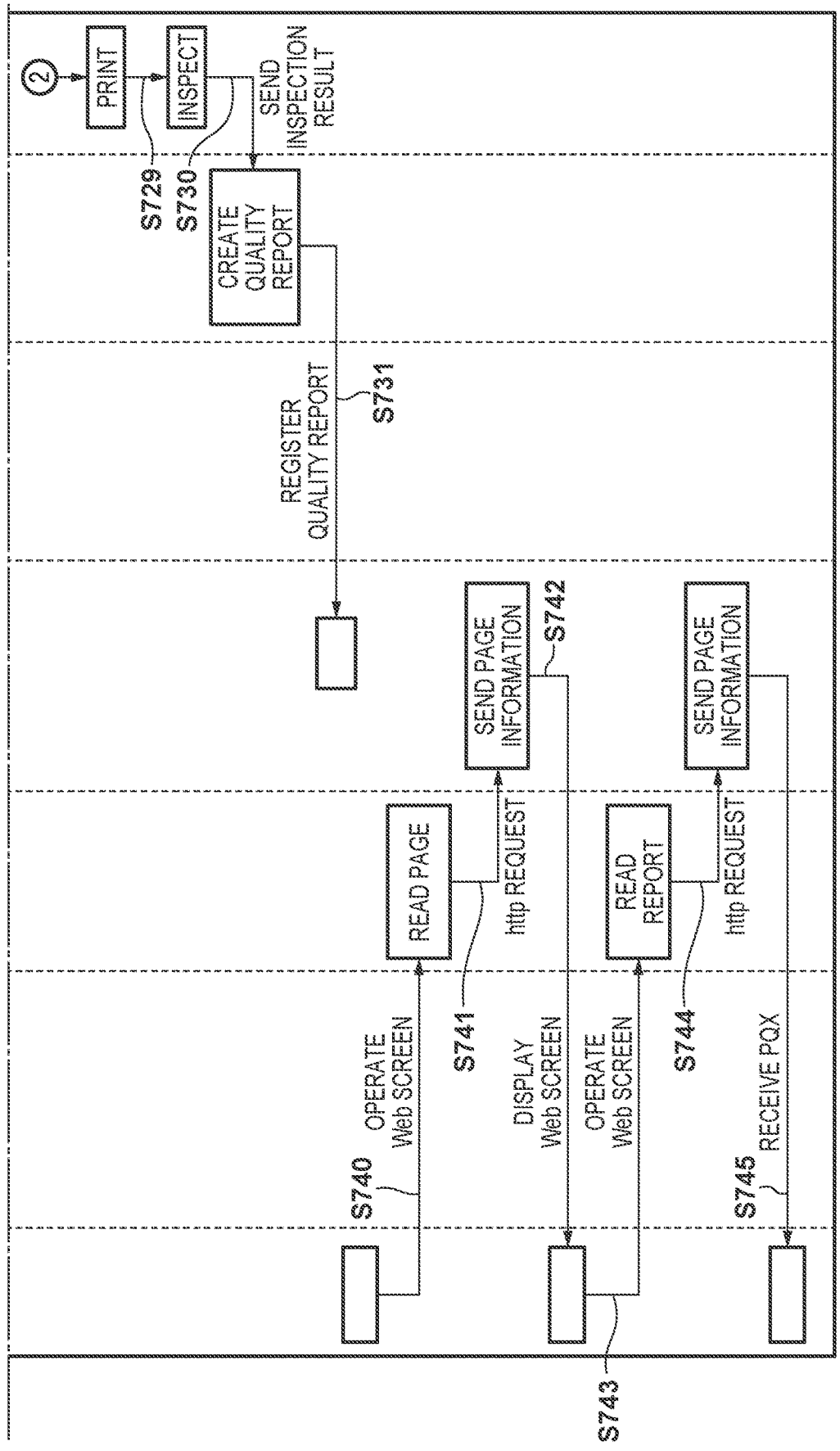

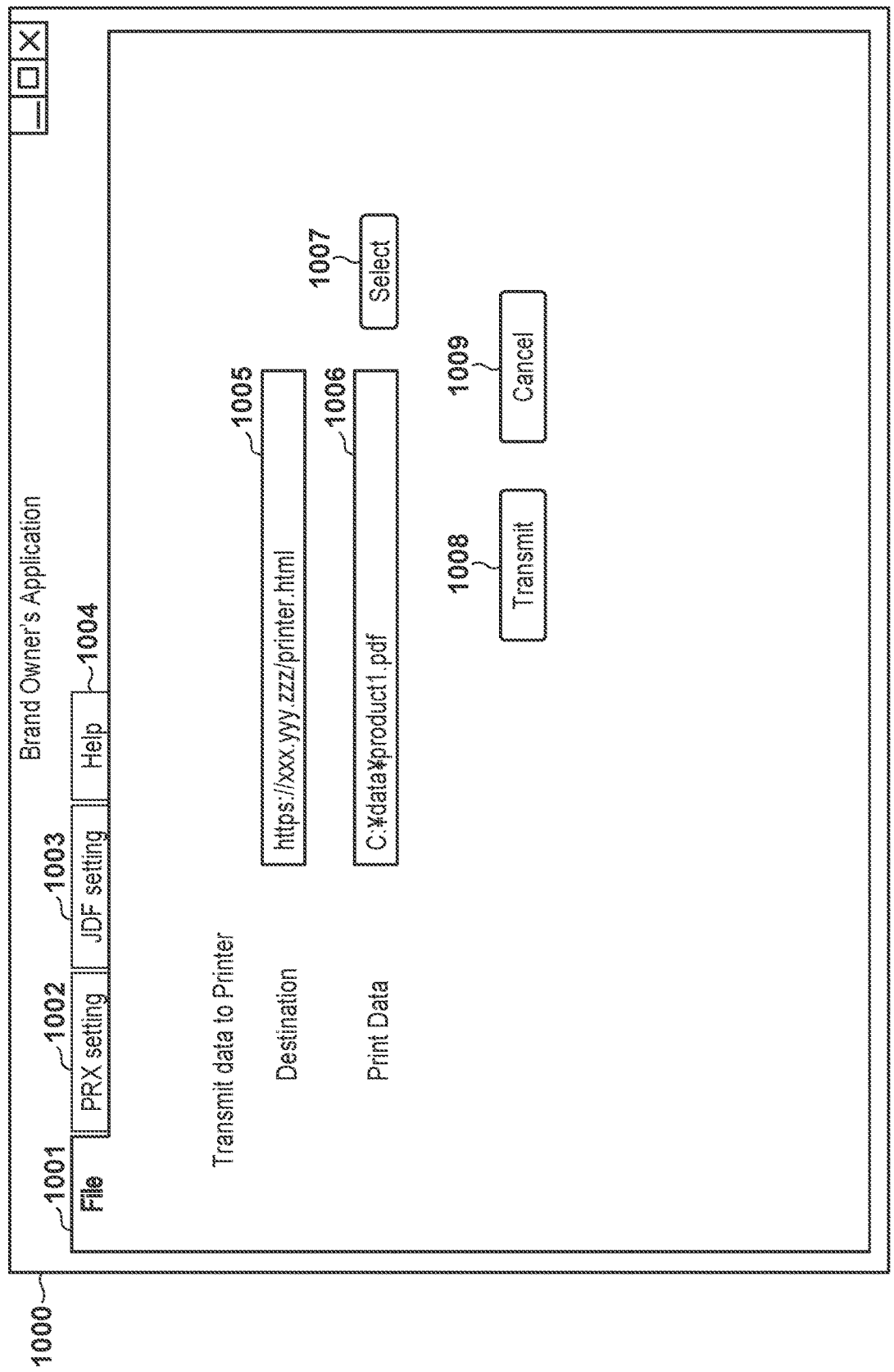

```xml
<?xml version="1.0" encoding="UTF-8"?>
<JDF ID="ID01" JobPartID="JobPartID01" Type="Combined"
 Types="LayoutPreparation Imposition Interpreting Rendering DigitalPrinting Varnishing Trimming"
 Activation="Active" Status="Ready" Version="1.3" Category="DigitalPrinting"
 ICSVersions="IDP_L1-1.0 Base_L1-1.0" MaxVersion="1.3"
 xmlns="http://www.CIP4.org/JDFSchema_1_1"
 xmlns:cj="http://www.canon.com/ns/CanonJDF"
 JobID="JobID01" DescriptiveName="ProductAAA">

<ResourcePool>
  <RunList Class="Parameter" ID="IDRL" Status="Available" PartIDKeys="Run">
    <RunList Run="0">
      <LayoutElement>
        <FileSpec MimeType="application/pdf" URL="cid:Sample" TotalPage="20"/>
      </LayoutElement>
    </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" ID="IDDPP" Status="Available"
    Collate="SheetSetAndJob" PartIDKeys="RunIndex"Amount="20000">
    <MediaRef rRef="MED_000"/>
    <DigitalPrintingParams RunIndex="4 199~209 249">
      <MediaRef rRef="Med_001"/>
    </DigitalPrintingParams>
    <DigitalPrintingParams RunIndex="0">
      <MediaRef rRef="Med_002"/>
    </DigitalPrintingParams>
  </DigitalPrintingParams>
  <Component Class="Quantity" ComponentType="PartialProduct" ID="IDC_DPP" Status="Unavailable"/>
  <VarnishingParams Class="Parameter" ID="IDVP" Status="Available" VarnishArea="Full" VarnishMethod="Blanket" NoOp="false"/>
  <Component Class="Quantity" ComponentType="PartialProduct" ID="IDC_VP" Status="Unavailable"/>
  <TrimmingParams Class="Parameter" ID="IDTP" Status="Available" Width="595" Height="842" NoOp="false"/>
  <Component Class="Quantity" ComponentType="FinalProduct" ID="IDC_TR" Status="Unavailable"/>
```

FIG. 11B

```
                                                                    ,-1109
<Media ID="MED_000" Class="Consumable" Status="Available" Dimension="913 1162" DesciptiveName="Media1"/>
<Media ID="MED_001" Class="Consumable" Status="Available" Dimension="913 1162" DesciptiveName="Media2(coated)"/>
<Media ID="MED_002" Class="Consumable" Status="Available" Dimension="913 1162" DesciptiveName="Media3(cardboard)"/>
</ResourcePool>
                                                                          1110
<ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Input" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink CombinedProcessIndex="4" Usage="Input" rRef="IDDPP"/>
  <ComponentLink Amount="1" CombinedProcessIndex="4" Usage="Output" rRef="IDC_DPP"/>
  <ComponentLink CombinedProcessIndex="5" Usage="Input" rRef="IDC_DPP"/>
  <VarnishingParamsLink CombinedProcessIndex="5" Usage="Input" rRef="IDVP"/>
  <ComponentLink CombinedProcessIndex="5" Usage="Output" rRef="IDC_VP"/>
  <ComponentLink CombinedProcessIndex="6" Usage="Input" rRef="IDC_VP"/>
  <TrimmingParamsLink CombinedProcessIndex="6" Usage="Input" rRef="IDTR"/>
  <ComponentLink CombinedProcessIndex="6" Usage="Output" rRef="IDC_TR"/>
  <MediaLink CombinedProcessIndex="4" Usage="Input" rRef="MED_000"/>
  <MediaLink CombinedProcessIndex="4" Usage="Input" rRef="MED_001"/>
  <MediaLink CombinedProcessIndex="4" Usage="Input" rRef="MED_002"/>
</ResourceLinkPool>
</JDF>
                                                                          1100
```

FIG. 11C

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo>
    <PRXDate>2019-03-27</PRXDate>
    <PRXId>prx01673</PRXId>
    <PRXVersion>1.01</PRXVersion>
  </PRXInfo>

<GradingInfo>
    <Grade DisplayLabel="Excellent" Rank="10"><ValueRange>
      <LogicalOperator>GT</LogicalOperator><CalculatedValue>8</CalculatedValue>
    </ValueRange></Grade>
        :
    <MinimumAcceptableRank>8</MinimumAcceptableRank>
    <DesiredRank>9</DesiredRank>
  </GradingInfo>

<QualityGoals>
    <Color>
      <ColorScore>
        <ColorScoringScale>
          <UoM>dE</UoM>
          <ParameterScoreDisplayLabel="Excellent" Rank="10"><ValueRange>
            <LogicalOperator>LT</LogicalOperator><CalculatedValue>1.0</CalculatedValue>
          <ValueRange></ParameterScore>
              :
      </ColorScore>
      <ColorParameter>
        <SamplingPosition>
          <SamplingPositionMatrix>
            <UoM>pt</UoM>
            <PositionDefinition PositionLabel="position1">
              <Page>1</Page><XPosition>334.0</XPosition><YPosition>423.0</YPosition>
              <CxFReferenceObjectIdLink>CxF001</CxFReferenceObjectIdLink>
            </PositionDefinition>
            <CalculationVariable>CA</CalculationVariable>
      </ColorParameter>
    <Color>
```

```
<Defects>                                                                  ~1113
  <UoM>mm</UoM>
  <ScoringInfo>
    <ParameterScoreDisplayLabel="Excellent" Rank="10">
      <ValueRange>
        <LogicalOperator>LT</LogicalOperator><CalculatedValue>0.1</CalculatedValue>
      </ValueRange>
      :
  </ScoringInfo>
  <DefectsParameter>
    <DefectType><DefectName>TextError</DefectName></DefectType>
  </DefectsParameter>
</Defects>

<Registration>                                                             ~1114
  <UoM>mm</UoM>
  <ScoringInfo>
    <ParameterScoreDisplayLabel="Excellent" Rank="10">
      <ValueRange>
        <LogicalOperator>LT</LogicalOperator><CalculatedValue>0.002</CalculatedValue>
      </ValueRange>
      :
    </ParameterScore>
  </ScoringInfo>
  <MinimumAcceptableRank>5</MinimumAcceptableRank>
  <DesiredRank>10</DesiredRank>
  <CalculationVariable>rg</CalculationVariable>
  <SamplingPositionMatrix>
    <UoM>mm</UoM><XPosition>23.00</Xposition><YPosition>53.00</Yposition>
  </SamplingPositionMatrix>
</Registration>
```

FIG. 11E

```
<Barcode>
  <BarcodeScore>
    <BarcodeScoringScale DisplayLabel="Pass" Rank=g1h><Value>1</Value></BarcodeScoringScale>
    <BarcodeScoringScale DisplayLabel="Fail" Rank=g0h><Value>0</Value></BarcodeScoringScale>
  </BarcodeScore>
  <MinimumAcceptableRank>1</MinimumAcceptableRank>
  <DesiredRank>1</DesiredRank>
  <CalculationVariable>bc</CalculationVariable>
  <SamplingPositionMatrix>
      <UoM>pt</UoM>
        <PositionDefinition PositionLabel="barcode01">
        <Page>102</Page><XPosition>133.0</XPosition><YPosition>324.0</YPosition>
      </PositionDefinition>
  </SamplingPositionMatrix>
</Barcode>
</QualityGoals>
<CxFReferenceData>
    <cc:CxF>
      <cc:Resources>
        <cc:ObjectCollection>
          <cc:Object ObjectType="Target" Name="1" Id="CxF001">
            <cc:CreationDate>2007-06-14T00:00:00-08:00</cc:CreationDate>
            <cc:ColorValues>
              <cc:ReflectanceSpectrum StartWL="380" ColorSpecification="CS1">
                0.0179408 0.0189865 ... 0.0448929
              </cc:ReflectanceSpectrum>
            </cc:ColorValues>
          </cc:Object>
            :
        <cc:ObjectCollection>
      <cc:Resources>
    </cc:CxF>
</CxFReferenceData>
</PRX>
```

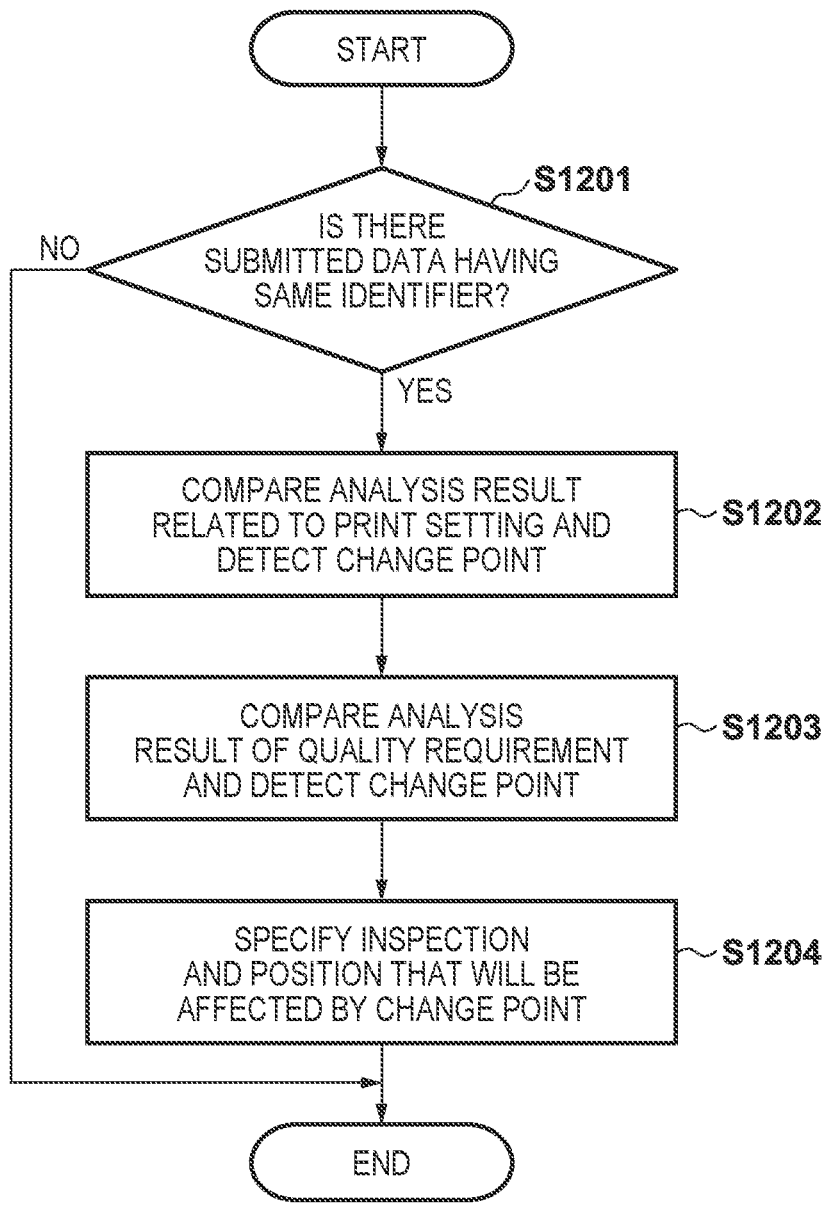

```xml
<?xml version="1.0" encoding="UTF-8" standalone="no"?>
<JDF xmlns="http://www.CIP4.org/JDFSchema_1_1" Activation="Active" Category="DigitalPrinting"
  DescriptiveName="order2348123" ICSVersions="IDP_L1-1.0 Base_L1-1.0" ID="ID01" JobID="Job"
  JobPartID="JobPartID01" MaxVersion="1.5" Status="Ready" Type="Combined"
  Types="LayoutPreparation Imposition Interpreting Rendering ColorSpaceConversion DigitalPrinting" Version="1.5">
  ...
  <ColorSpaceConversionParams Class="Parameter" ID="IDCSCP" PartIDKeys="RunIndex" Status="Available">
    <ColorSpaceConversionParams RunIndex="34">                                                          ~1402
      <ColorSpaceConversionOp SourceCS="CMYK" SourceObjects="All">
        <FileSpec ResourceUsage="SourceProfile" UserFileName="JapanColor"/>
      </ColorSpaceConversionOp>
    </ColorSpaceConversionParams>
  </ColorSpaceConversionParams>
  <DigitalPrintingParams Class="Parameter" ID="IDDPP" Status="Available">
    <MediaRef rRef="MED_000"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available"/>
</ResourcePool></JDF>
```

```xml
<?xml version="1.0" encoding="UTF-8" standalone="no"?>
<JDF xmlns="http://www.CIP4.org/JDFSchema_1_1" Activation="Active" Category="DigitalPrinting"
  DescriptiveName="order2348123" ICSVersions="IDP_L1-1.0 Base_L1-1.0" ID="ID01" JobID="Job"
  JobPartID="JobPartID01" MaxVersion="1.5" Status="Ready" Type="Combined"
  Types="LayoutPreparation Imposition Interpreting Rendering ColorSpaceConversion DigitalPrinting" Version="1.5">
  ...
  <ColorSpaceConversionParams Class="Parameter" ID="IDCSCP" PartIDKeys="RunIndex" Status="Available">
    <ColorSpaceConversionParams RunIndex="34">                                                          ~1404
      <ColorSpaceConversionOp SourceCS="CMYK" SourceObjects="All">
        <FileSpec ResourceUsage="SourceProfile" UserFileName="U.S. Web Coated v1.00"/>
      </ColorSpaceConversionOp>
    </ColorSpaceConversionParams>
  </ColorSpaceConversionParams>
  <DigitalPrintingParams Class="Parameter" ID="IDDPP" Status="Available">
    <MediaRef rRef="MED_000"/>
  </DigitalPrintingParams>
  <Component Class="Quantity" ComponentType="FinalProduct" ID="IDC_DPP" Status="Unavailable"/>
  <Media Class="Consumable" Dimension="842 595" ID="MED_000" Status="Available"/>
</ResourcePool></JDF>
```

FIG. 14B    1410

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo>
  <PRXDate>2019-03-27</PRXDate>
  <PRXId>prx01673</PRXId>
  <PRXVersion>1.00</PRXVersion>
</PRXInfo>
<GradingInfo>
  <Grade DisplayLabel="Excellent" Rank="10">
    <ValueRange>
      <LogicalOperator>GT</LogicalOperator><CalculatedValue>8</CalculatedValue>
    </ValueRange>
  </Grade>
  <MinimumAcceptableRank>8</MinimumAcceptableRank>
    <DesiredRank>9</DesiredRank>
</GradingInfo>

<QualityGoals>
    <ColorScore>
      <ColorScoringScale>
        <SamplingPosition>
          <SamplingPositionMatrix>
            <UoM>pt</UoM>
            <PositionDefinition PositionLabel="position1">
              <Page>1</Page><XPosition>334.0</XPosition><YPosition>423.0</YPosition>
              <CxFReferenceObjectIdLink>CxF001</CxFReferenceObjectIdLink>
            </PositionDefinition>
            <PositionDefinition PositionLabel="position2">
              <Page>2</Page><XPosition>133.0</XPosition><YPosition>324.0</YPosition>
              <CxFReferenceObjectIdLink>CxF002</CxFReferenceObjectIdLink>
            </PositionDefinition>
              :
            <PositionDefinition PositionLabel="position34">
              <Page>34</Page><XPosition>435.0</XPosition><YPosition>342.0</YPosition>
              <CxFReferenceObjectIdLink>CxF034</CxFReferenceObjectIdLink>
            </PositionDefinition>
              :
        </SamplingPosition>
      <ColorScoringScale>
    <ColorScore>
  </QualityGoals>
  <CxFReferenceData>
    :
  </CxFReferenceData>
</PRX>
```

F I G. 14C

1411

```
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/2001/XMLSchema-instance"
xsi:schemaLocation="http://xxx.yyy.zzz.org/prx PRX.xsd">

<PRXInfo>
  <PRXDate>2019-03-27</PRXDate>
  <PRXId>prx01673</PRXId>
  <PRXVersion>1.01</PRXVersion>
</PRXInfo>
<GradingInfo>
  <Grade DisplayLabel="Excellent" Rank="10">
    <ValueRange>
      <LogicalOperator>GT</LogicalOperator><CalculatedValue>8</CalculatedValue>
    </ValueRange>
  </Grade>
  <MinimumAcceptableRank>8</MinimumAcceptableRank>
    <DesiredRank>9</DesiredRank>
</GradingInfo>

<QualityGoals>
<ColorScore>
    <ColorScoringScale>
      <SamplingPosition>
        <SamplingPositionMatrix>
          <UoM>pt</UoM>
          <PositionDefinition PositionLabel="position1">
            <Page>1</Page><XPosition>334.0</XPosition><YPosition>423.0</YPosition>
            <CxFReferenceObjectIdLink>CxF001</CxFReferenceObjectIdLink>
          </PositionDefinition>
          <PositionDefinition PositionLabel="position2">
            <Page>2</Page><XPosition>133.0</XPosition><YPosition>324.0</YPosition>
            <CxFReferenceObjectIdLink>CxF001</CxFReferenceObjectIdLink>
          </PositionDefinition>
```

FIG. 14D

```
         ⋮
   <PositionDefinition PositionLabel="position2">
        <Page>34</Page><XPosition>435.0</XPosition><YPosition>342.0</YPosition>
        <CxFReferenceObjectIdLink>CxF001</CxFReferenceObjectIdLink>
   </PositionDefinition>
         ⋮
   </SamplingPosition>
  <ColorScoringScale>
 <ColorScore>
<Barcode>
 <BarcodeScore>
   <BarcodeScoringScale DisplayLabel="Pass" Rank=g1h><Value>1</Value></BarcodeScoringScale>
   <BarcodeScoringScale DisplayLabel="Fail" Rank=g0h><Value>0</Value></BarcodeScoringScale>
 </BarcodeScore>
 <MinimumAcceptableRank>1</MinimumAcceptableRank>
 <DesiredRank>1</DesiredRank>
 <CalculationVariable>bc</CalculationVariable>
 <SamplingPositionMatrix>
    <UoM>pt</UoM>
    <PositionDefinition PositionLabel="barcode01">
      <Page>102</Page><XPosition>133.0</XPosition><YPosition>324.0</YPosition>
    </PositionDefinition>
 </SamplingPositionMatrix>
</Barcode>
</QualityGoals>
<CxFReferenceData>
    ⋮
</CxFReferenceData>
</PRX>
```

| DIFFERENCE | DIFFERENCE POSITION DATA | AFFECTED INSPECTION |
|---|---|---|
| CHANGE INSPECTION POSITION SPECIFICATION | QUALITY REQUIREMENT | INSPECTION WITH RESPECT TO DESIGNATED POSITION |
| CHANGE REFERENCE IMAGE | QUALITY REQUIREMENT | COLORIMETRY |
| ADD INSPECTION | QUALITY REQUIREMENT | ADDED INSPECTION |
| CHANGE EVALUATION CRITERIA | QUALITY REQUIREMENT | INSPECTION OF EVALUATION CRITERIA BEING CHANGED |
| IMAGE PROCESSING SETTING | SET PRINT SETTING | COLORIMETRY |
| CHANGE VARNISH | SET PRINT SETTING | BARCODE, PEELED VARNISH |
| CHANGE PRINT DATA | SET PRINT SETTING | COLORIMETRY, Defect |
| PAPER SPECIFICATION | SET PRINT SETTING | COLORIMETRY, Defect |
| PRINTING APPARATUS | SET PRINT SETTING | COLORIMETRY, IMAGE MISALIGNMENT, Defect |
| ... | | |

F I G. 15A

```xml
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">

<PQXInfo>
       <PQXDate>2020-03-17</PQXDate>
       <PQXId>pqx0023</PQXId>
       <RefPRXId>prx01673</RefPRXId>
       <RefPRXVersion>1.01</RefPRXVersion>
    </PQXInfo>

<SampleCollection>
      <Sample>
       <ColorReport>
         <MeasurementSet>
          <PositionOnSample PositionLabel="position1">1</PositionOnSample>
          <Measurement Id="CM001">
                    <CxFSampleObjectIdLink>CxF1</CxFSampleObjectIdLink>
          </Measurement>
         <MeasurementSet>
         <MeasurementSet>
          <PositionOnSample PositionLabel="position2">1</PositionOnSample>
          <Measurement Id="CM002">
                    <CxFSampleObjectIdLink>CxF2</CxFSampleObjectIdLink>
          </Measurement>
         <MeasurementSet>
```

F I G. 15B

```xml
...
    <MeasurementSet Update="true">
        <PositionOnSample PositionLabel="position34">1</PositionOnSample>
        <Measurement Id="CM034">
                <CxFSampleObjectIdLink>CxF34</CxFSampleObjectIdLink>
        </Measurement>
    <MeasurementSet>
   </ColorReport>
    <RegistrationReport>
    <UoM>mt</UoM>
    <XMaxOffset>0.001</XMaxOffset>
    <YMaxOffset>0.002</YMaxOffset>
    <SamplingPositionMatrix><UoM>mm</UoM><XPosition>3.00</Xposition><YPosition>3.00</Yposition>
    </RegistrationReport>
    <BarcodeReport>
        <VerificationSet Update="true">
            <PositionOnSample PositionLabel="barcode01">1</PositionOnSample>
            <ISO2DVerification><
              Decoce>pass</Decode>
            </ISO2DVerification>
        </VerificationSet>
    </BarcodeReport>
   </Sample>
 </SampleCollection>

<CxFSampleData>
   <CxFId="CxF001">
     <ReflectanceSpectrum>0.221 0.330 0.443 0.001 0.221 0.235 0.110 0.330 0.559 0.662 ... 0.221</ReflectanceSpectrum>
   <CxF>
     ...
  </CxFSampleData>
</PQX>
```

| MANAGEMENT NUMBER No.1919-1991841 | |
|---|---|
| TASK PROCESS CHART | |
| CUSTOMER NAME     INC. OO | RECEPTION OF ORDER NUMBER     IDC-3181 |
| GOODS NAME     PROMOTION DOCUMENT A | QUANTITY |
| RECEPTION OF ORDER DATE | DELIVERY SCHEDULE DATE |
| TASK DATE | OPERATOR |

| # | TASK DETAILS | # | TASK DETAILS |
|---|---|---|---|
| 1 | PRINT  ~1902  \|\|\|\|\|\|\|\|\|\|\|\|\|\|  *3 4 5 3 4 2 3 4 8 0 9 0 2 3 4* | 7 | PACKING  ~1908  \|\|\|\|\|\|\|\|\|\|\|\|\|\|  *6 0 9 8 2 3 4 6 9 7 2 3 4 0 8* |
| 2 | REGISTER MISALIGNMENT INSPECTION  ~1903  \|\|\|\|\|\|\|\|\|\|\|\|\|\|  *5 6 7 6 4 2 3 4 2 3 4 5 1 2 3* | 8 | TRANSPORTATION  ~1909  \|\|\|\|\|\|\|\|\|\|\|\|\|\|  *8 9 7 7 2 3 4 9 8 2 1 3 7 0 8* |
| 3 | PRINT INSPECTION  ~1904  \|\|\|\|\|\|\|\|\|\|\|\|\|\|  *9 2 7 4 9 5 8 8 5 9 7 2 0 4 5* | 9 | SHIPPING  ~1910  \|\|\|\|\|\|\|\|\|\|\|\|\|\|  *3 8 2 3 6 4 9 2 3 4 8 6 4 5 6* |
| 4 | VARNISH COATING  ~1905  \|\|\|\|\|\|\|\|\|\|\|\|\|\|  *0 9 8 2 3 4 7 0 3 4 3 4 5 2 3* | 10 | |
| 5 | CUTTING  ~1906  \|\|\|\|\|\|\|\|\|\|\|\|\|\|  *4 5 8 2 7 3 4 7 1 0 2 8 4 3 5* | 11 | |
| 6 | COLORIMETRIC INSPECTION  ~1907  \|\|\|\|\|\|\|\|\|\|\|\|\|\|  *7 6 2 3 4 5 4 0 6 5 4 3 4 2 5* | 12 | COMPLETION CONFIRMATION  ~1911  \|\|\|\|\|\|\|\|\|\|\|\|\|\|  *8 9 2 3 9 8 5 6 8 2 2 3 4 2 3* |

MANAGEMENT NUMBER
No.1919-1991841

TASK PROCESS CHART

| CUSTOMER NAME | INC. OO | RECEPTION OF ORDER NUMBER | IDC-3181 |
|---|---|---|---|
| GOODS NAME | PROMOTION DOCUMENT A | QUANTITY | |
| RECEPTION OF ORDER DATE | | DELIVERY SCHEDULE DATE | |
| TASK DATE | | OPERATOR | |

| # | TASK DETAILS | # | TASK DETAILS |
|---|---|---|---|
| 1 | PRINT<br>*3453423480902 34* | 7 | SHIPPING<br>*3823649234 8 6456* |
| 2 | CUTTING<br>*0982347034 34523* | 8 | |
| 3 | COLORIMETRIC INSPECTION<br>*2372756409 12362* | 9 | |
| 4 | BARCODE INSPECTION<br>*9872782746 2 7742* | 10 | |
| 5 | PACKING<br>*6098234697 23408* | 11 | |
| 6 | TRANSPORTATION<br>*8977234982 13708* | 12 | COMPLETION CONFIRMATION<br>*8923985682 23423* |

1/1

F I G. 20

| PERFORMANCE DETAILS | PERFORMANCE APPARATUS | INSTRUCTION FORMAT |
|---|---|---|
| GS1 CODE INSPECTION | BD634 | INSTRUCTIONS |
| TWO-DIMENSIONAL BARCODE INSPECTION | UD1110 | INSTRUCTIONS |
| VARNISH COATING | NDC-12KB | JDF |
| CUT SHEET PRINTING | iPRC11000 | JDF |
| ROLL PAPER PRINTING | ProStream10000 | JDF |
| COLORIMETRIC INSPECTION | Xcolor-2 | INSTRUCTIONS |
| PRINT INSPECTION | QC-10 | XML |
| ⋮ | | |

INFORMATION PROCESSING APPARATUS, METHOD, AND PRODUCT COMPARING NEW AND OLD VERSIONS OF SUBMITTED DATA TO SPECIFY INSPECTION AFFECTED BY DIFFERENCE

BACKGROUND

Field of the Disclosure

The present disclosure relates to an information processing apparatus, a method, and a medium, with respect to reports and the like for quality inspection of printed materials, for example.

Description of the Related Art

In the field of commercial printing, it is envisioned that there will be a need for digitalizing the exchange of information regarding requirements and reporting on the quality of products that customers request from printing businesses. Examples of specifications for achieving this are standards such as PQX/PRX (Print Quality eXchange, Print Request eXchange), JDF (Job Definition Format), and the like. A series of processes in which the customer communicates its requirements for the quality of products to the printing business using PRX, and the printing business then reports the quality of the products produced to the customer using PQX, is digitalized.

There are multiple rounds of negotiations and coordination between the printing business and the customer regarding order details before the actual production of the printed material takes place. In addition to order conditions such as cost and deadline, various requirements for the product are communicated while referring to the results of adjustment printing (proof printing) in order to approach the expected printed material. Requirements for printed materials have conventionally been communicated using qualitative expressions. For example, while viewing a printed material used for adjustment, a client may use sensory expressions to make instructions, such as "this part should be brighter" or "the expression should be smoother". The printing business follows the instructions and adjusts various types of settings and apparatuses related to printing, and then performs the adjustment printing again.

The aforementioned PQX/PRX can also be used to quantitatively express measurement results, requirements, and the like during adjustment. A customer can use PRX to express their requirements accurately, and the printing business can create PQX to precisely represent the quality of the printed material produced through the adjustment printing. By making it possible to accurately communicate requirements, quality, and the like, the adjustments can be made smoothly, and the start of actual production can be sped up.

On the other hand, there are issues that need to be resolved in order to use PQX/PRX, which can precisely represent requirements and quality, for adjustment. In other words, while PRX, settings pertaining to printing, and the like required by the customer are changed in detail through adjustments, PQX, which is a quality report, has results of quality measurements, which are not affected by changes due to adjustments, written uniformly. The more detailed the quality requirements are, the more detailed and extensive the results of the PQX, which is a report thereof, will be, making it difficult to find where the effects of the adjustments are appearing. Because the state of the apparatuses used to create the printed materials also affects the quality measurement results, it is not possible to identify the effects of adjustment simply by comparing instances of PQX with each other.

From the perspective of omitting unnecessary inspections, Japanese Patent Laid-Open No. 2005-248578 and the like propose comparing the date when the inspection details are defined with the date on which the previous inspection was performed, and determining not to perform an inspection if the definition of the inspection details is older. However, the quality requirements specifying the inspection details are always created before the printing for adjustment is performed, and as such, the inspections cannot be narrowed down using this method.

SUMMARY

Embodiments of the present disclosure have been conceived in light of such circumstances. One or more embodiments of the present disclosure create a quality report so that when a quality requirement or a print setting is changed, a quality item affected by the change can be identified.

Embodiments of the present disclosure include an information processing apparatus configured to, on the basis of submitted data, generate a quality report for a printed material inspected by an inspection apparatus, the information processing apparatus comprising: at least one processor; and at least one memory, wherein when a program stored in the at least one memory is executed by the at least one processor, the program causes the at least one processor to function as: a first specifying unit that, when the submitted data is a new version and an old version of the submitted data is present, specifies a difference by comparing the new version of the submitted data with the old version of the submitted data; a second specifying unit that, on the basis of the difference, specifies an inspection for which an inspection result will be affected by the difference; and a creation unit that creates a quality report which makes it possible to distinguish, among inspection results received from the inspection apparatus, an inspection result for the inspection that will be affected from another inspection result is provided.

Some embodiments include an information processing apparatus configured to issue an instruction to inspect a printed material to an inspection apparatus on the basis of submitted data, the information processing apparatus comprising: at least one processor; and at least one memory, wherein when a program stored in the at least one memory is executed by the at least one processor, the program causes the at least one processor to function as: a first specifying unit that, when the submitted data is a new version and an old version of the submitted data is present, specifies a difference by comparing the new version of the submitted data with the old version of the submitted data; a second specifying unit that, on the basis of the difference, specifies an inspection for which an inspection result will be affected by the difference; and an issuing unit that issues an instruction for inspection to the inspection apparatus performing the inspection that will be affected is provided.

According to embodiments of the present disclosure, a quality report is created so that when a quality requirement or a print setting is changed, a quality item affected by the change can be identified. This makes it possible to easily identify quality items affected by adjustments made to quality requirements and print settings, even when a detailed quality report constituted by many quality items is created. This also makes it possible to easily distinguish quality items that change due to factors aside from intentional adjustments made by a customer, such as changes in the states of apparatuses.

Further features of the present disclosure will become apparent from the following description of exemplary embodiments with reference to the attached drawings.

BRIEF DESCRIPTION OF THE DRAWINGS

FIG. 4 is a diagram illustrating the software configuration of the image forming apparatus.

FIG. 5 is a diagram illustrating the software configuration of an information processing apparatus of a printing business system.

FIG. 6 is a diagram illustrating the software configuration of an information processing apparatus of a customer system.

FIGS. 7A to 7C are system flowcharts illustrating the processing flow of the print processing system as a whole, according to a first embodiment.

FIGS. 10A, 10B, and 10C are diagrams illustrating an operation unit of an application system running on the information processing apparatus of the customer system.

FIGS. 11A and 11B are diagrams illustrating an example of JDF (print settings).

FIGS. 11C, 11D, and 11E are diagrams illustrating an example of PRX (quality requirements) sent and received between systems.

FIG. 12 is a flowchart illustrating the flow of processing by a CPU 301 of the information processing apparatus of the printing business system, performed in change determination processing.

FIGS. 14A-1, 14A-2, 14B, 14C, 14D, and 14E are schematic diagrams illustrating operations performed in the change determination processing.

FIGS. 15A and 15B are schematic diagrams illustrating an example of a quality report created according to embodiments of the present disclosure.

FIGS. 19A and 19B are diagrams illustrating an example of work process instructions.

FIG. 20 is a diagram illustrating an example of a process-apparatus correspondence table.

DESCRIPTION OF THE EMBODIMENTS

Figure 1:
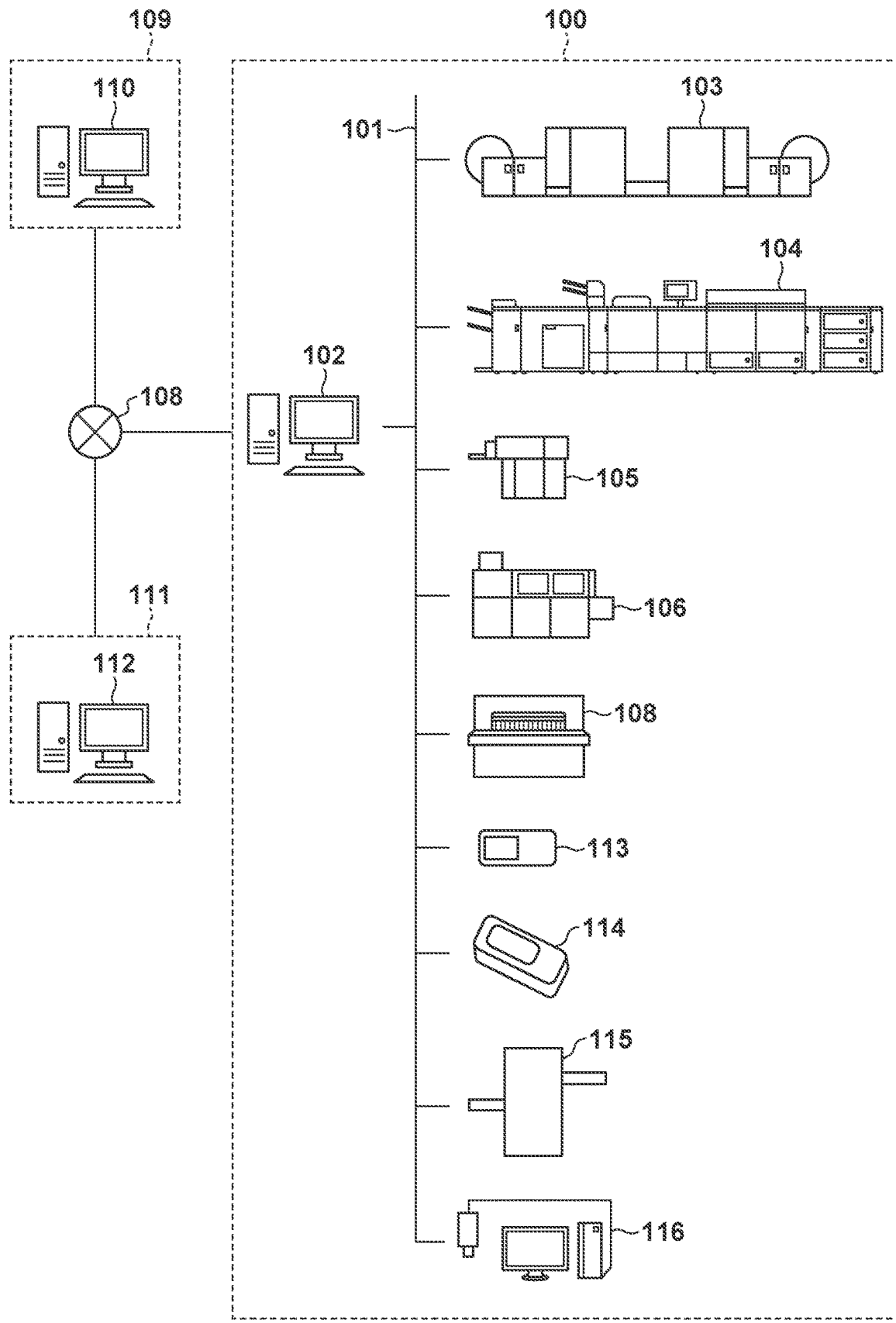
FIG. 1 is a block diagram illustrating a print processing system as a whole.

Hereinafter, embodiments will be described in detail with reference to the attached drawings. Note, the following embodiments are not intended to limit the scope of the disclosure. Multiple features are described in the embodiments, but not all such features are required in some embodiments, and multiple such features may be combined as appropriate. Furthermore, in the attached drawings, the same reference numerals are given to the same or similar configurations, and redundant description thereof is omitted.

First Embodiment

System Configuration

FIG. 1 is a block diagram illustrating a system according to the present embodiment. The system is broadly divided into a customer system 109, a printing business system 100, and the printing business' parent company system 111, all of which are connected to each other over the Internet 108. The customer system 109 includes at least one information processing apparatus 110. Likewise, the parent company system 111 includes at least one information processing apparatus 112. Note that the system as a whole illustrated in FIG. 1 will be called an "information processing system" or a "workflow system". However, the printing business system 100 managed by workflow software (described later) may also be called a "workflow system".

The internal configuration of the printing business system 100 will be described in detail hereinafter. As illustrated in FIG. 1, a plurality of apparatuses are connected to each other over a network 101. These connected apparatuses include an information processing apparatus 102, an image forming apparatus 103, an image forming apparatus 104, a varnish coater 105, an adhesive binding device 106, a cutting apparatus 108, a barcode inspection device 113, a colorimeter 114, an image see-through inspection apparatus 115, and a print inspection apparatus 116. The image forming apparatus 103 is used for a continuous sheet, and the image forming apparatus 104 is used for cut sheets. These apparatuses, which have different printing mechanisms, enable the printing business to produce products requested by a customer in an optimal manner. The varnish coater 105, the adhesive binding device 106, and the cutting apparatus 108 are what are known as "post-processing apparatuses". The varnish coater 105 coats, with varnish, a designated area of a sheet on which an image is formed, for example. The barcode inspection device 113, the colorimeter 114, the image see-through inspection apparatus 115, and the print inspection apparatus 116 are inspection apparatuses for inspecting the print quality. Each inspection apparatus inspects an inspection item corresponding to that apparatus. Note that the image forming apparatuses according to the present embodiment have inspection functions, and depending on the item to be inspected, can perform inspections without using an independent inspection apparatus.

Each apparatus operates under the control of workflow software running on the information processing apparatus 102, processes job data submitted through the customer system 109, and produces a product. The job data submitted through the customer system 109 includes image data, a job ticket, and quality requirement data. The job ticket is submitted data in, for example, the JDF or PDF format. The quality requirement data is data in the PRX (Print Request eXchange) format, for example. Data in the PRX format may be referred to simply as "PRX". Furthermore, the information processing apparatus 102 in the printing business system 100 has a function for receiving notifications of processing results from the aforementioned apparatuses, generating quality report data on the basis of the received data, and sending the quality report data to the customer system 109. The quality report data is data in the PQX (Print Quality eXchange) format, for example. Data in the PQX format may be referred to simply as "PQX".

Note that digitalizing series of processes in which the customer communicates its requirements for the quality of products to the printing business using PRX, and then having the printing business report the quality of the products produced to the customer using PQX, provides the following advantages.

First, quantitatively presenting requirement items pertaining to the quality of the product the customer requests from the printing business, which has been done in the past, makes it possible to reduce the likelihood of mutual misunderstandings about the quality of the product. Second, the quality of the product produced by the printing business can be visualized electronically, enabling the customer to immediately control the quality of the product requested for production. Third, an effect of digitalizing the requirements and reports pertaining to quality is that doing so makes it easier for the customer and the printing business to take action to ensure uniform quality, even for products which take a long time to produce and fluctuations in quality may therefore occur over time. Fourth, even when a customer requests production from multiple printing businesses, it is possible to both visualize variations in quality among the multiple printing businesses, and make it easier for the customer and the printing businesses to take action to ensure uniform quality.

Hardware Configuration of Image Forming Apparatus

Figure 2:
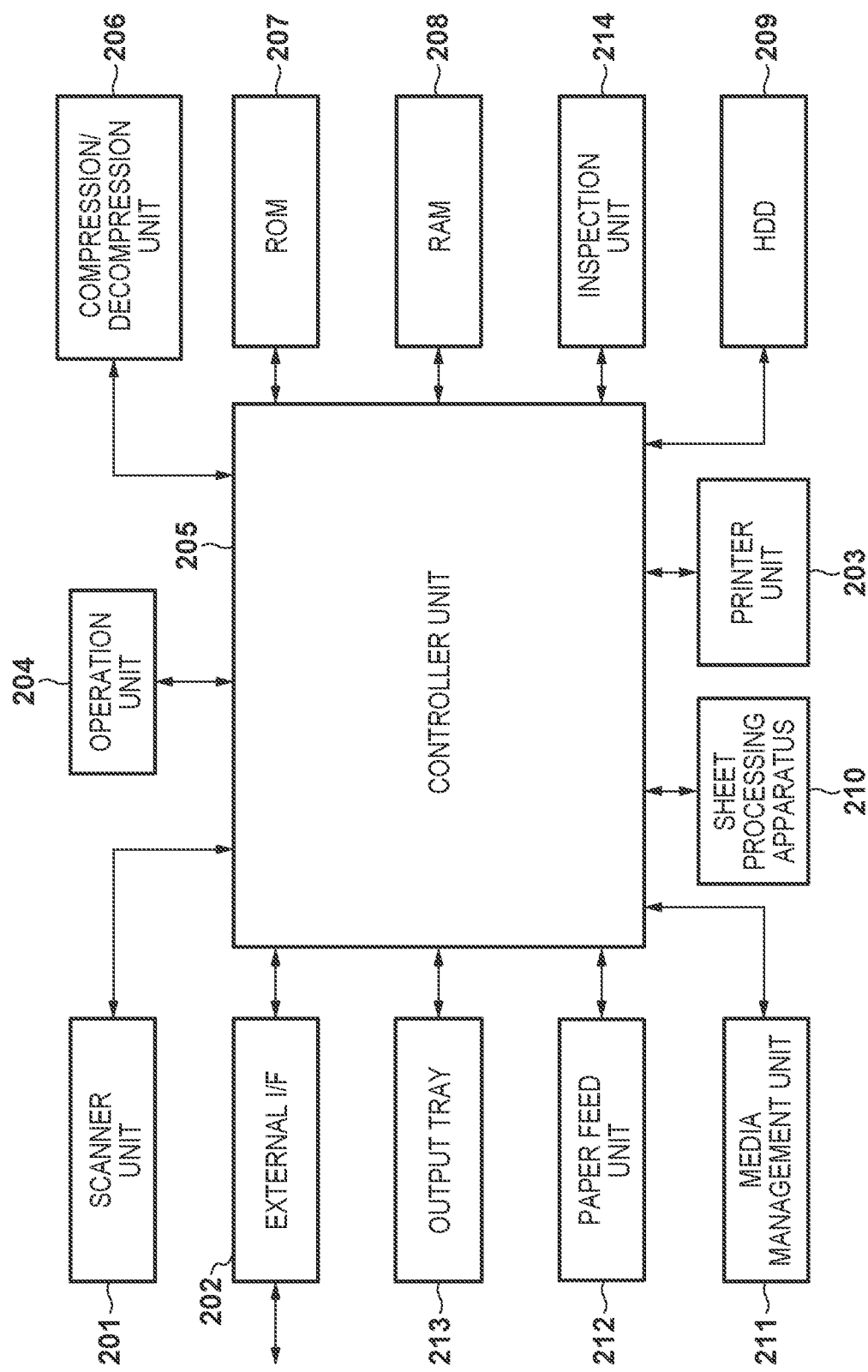
FIG. 2 is a diagram illustrating the hardware configuration of an image forming apparatus.

FIG. 2 is a diagram illustrating the hardware configuration of the image forming apparatus 104. The image forming apparatus 104 has a reading function for reading an image on a sheet, and a printing function for printing an image onto a sheet. The image forming apparatus 104 also has a post-processing function for binding a plurality of sheets onto which images have been printed, aligning a plurality of sheets, splitting the discharge destinations of a plurality of sheets among a plurality of trays, and so on. Note that "sheet" includes paper such as standard paper and heavy paper, as well as film sheets and the like.

The image forming apparatus 104 illustrated in FIG. 2 is configured to be capable of complex sheet processing in which apparatuses having multiple different roles are interconnected. The image forming apparatus 104 is an apparatus for using expanded image data to form an image, using toner, onto a medium transported from a paper feed unit 212 in which the medium is stored.

The image forming apparatus 104 is provided with a scanner unit 201 and an operation unit 204. The operation unit 204 provides various types of interfaces for when an operator makes various types of settings and performs operations in the image forming apparatus 104. The image forming apparatus 104 according to the present embodiment is configured so that various types of auxiliary apparatuses can be attached/removed. Here, a sheet processing apparatus 210 is given as an example of an auxiliary apparatus.

The sheet processing apparatus 210 is an apparatus for obtaining a product by performing various types of processing on the media obtained after an image is formed by a printer unit 203. An output tray 213 forms a tray part for discharging and stacking an output material processed by the sheet processing apparatus 210.

An inspection unit 214 is a module provided for inspecting image information formed onto a sheet by the printer unit 203. Items to be inspected include an amount of misalignment between printing positions of each of CMYK plates (register misalignment) and a difference between a color formed by combining the CMYK plates and a color specified in the print data (color difference). Furthermore, the reading accuracy of a barcode part included in the image that is formed, general image defects such as smudging and scratches on the image, and the like are also items to be inspected. This module has a function to convert such image defects into inspection result data by optically reading the image of the sheet after the image has been formed.

A hard disk 209 (also called an "HDD") is non-volatile memory, and stores the data of a plurality of jobs to be processed, various types of management information, and the like. Information indicating inspection results may be included in the stored information.

Job data received from the scanner unit 201 is printed by the printer unit 203 via the HDD 209. Job data received from an external apparatus via an external I/F unit 202, which corresponds to an example of a communication unit, is printed by the printer unit 203 via the HDD 209. The external I/F unit 202 sends and receives image data and the like to and from facsimile machines, network-connected devices, and dedicated external apparatuses. The operation unit 204 corresponds to a user interface unit, and includes a display unit here.

A controller unit 205 (also called a "control unit" or "CPU") comprehensively controls processing, operations, and the like performed by various types of units provided in the image forming apparatus 104. ROM 207 stores various types of control programs required in the present embodiment, including programs for executing the various types of processing and the like described later with reference to flowcharts. The ROM 207 also stores a display control program for displaying various types of UI screens in the display unit of the operation unit 204, including user interface screens (called "UI screens" hereinafter).

By reading out and executing the programs stored in the ROM 207, the controller unit 205 causes the image forming apparatus 104 to execute the various types of operations described in the present embodiment. The programs also include a program for interpreting code data that forms print data, such as PDF data received from an external apparatus (not shown) via the external I/F unit 202, and developing the print data into raster image data (bitmap image data). A program for interpreting and processing print jobs received from an external apparatus (not shown) via the external I/F unit 202 is also stored in the ROM 207. These are mainly processed by software. The various types of programs stored in the ROM 207 will be described in detail later.

The HDD 209 (hard disk) is a large-capacity storage apparatus that stores image data compressed by a compression/decompression unit 206. The HDD 209 is configured to be able to hold a plurality of types of data, such as print data of jobs to be processed. The controller unit 205 can store the data of a job to be processed, which is input via various types of input units such as the scanner unit 201 and the external I/F unit 202, in the HDD 209, process the data, and cause the printer unit 203 to print the job. The controller unit 205 can also send processed data to an external apparatus via the external I/F unit 202. In this manner, the controller unit 205 can execute various types of output processing for the data of jobs to be processed, stored in the HDD 209.

Furthermore, the image forming apparatus 104 is configured so that a file system constructed in the HDD 209 can be shared with, sent to, and received from an external apparatus by the controller unit 205 reading and executing a program in the ROM 207.

The compression/decompression unit 206 compresses and decompresses data such as image data stored in RAM 208 and the HDD 209, using various types of compression methods such as JBIG, JPEG, or the like. Using the configuration described above, the controller unit 205, which is an example of a control unit provided in the image forming apparatus 104 (which may also be called a "printing system"), also controls the operations of the sheet processing apparatus 210.

A media management unit 211 is a module for managing information pertaining to media types. Here, "media" refers to the medium used for image formation, and more specifically, to sheets of paper or the like.

The inspection unit 214 is a module provided for inspecting an image formed on a sheet under the control of the controller unit 205. The inspection unit 214 includes sensors, such as a camera, a CIS, and the like, and obtains an image formed on one or both sides of the sheet as digital data. The image is then compared with reference image data stored in advance, and the differences for each of inspection items are obtained as inspection result data. Inspection result information converted into inspection result data is sent to the information processing apparatus 102 via the external I/F unit 202. Note that the comparison with the reference image data is not performed for all inspection items. For example, in quality inspection for barcodes, an attempt is made to read the barcode, and whether or not the correct value can be read is inspected. Additionally, for example, if a different image is formed on each sheet being transported, the reference image data may be pre-registered so as to be read out according to the order in which the images are formed. The inspection unit 214 verifies the image data obtained from the sheet against the pre-registered reference image data according to the order thereof, and outputs inspection data for each inspection item.

Configuration of Information Processing Apparatuses

Figure 3:
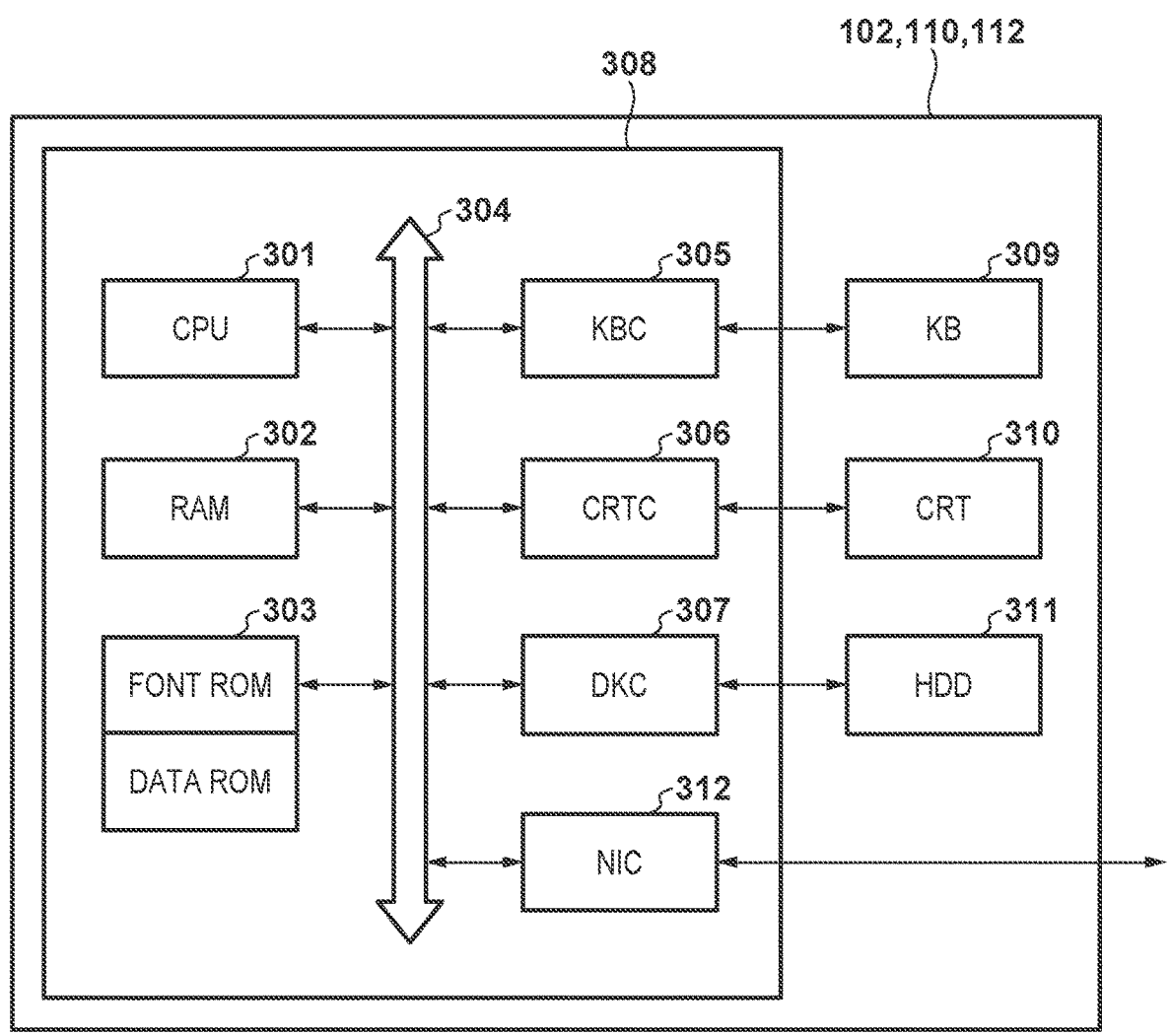
FIG. 3 is a diagram illustrating the hardware configuration of an information processing apparatus.

FIG. 3 is a block diagram illustrating the configuration of the information processing apparatuses 102, 110, and 112. In FIG. 3, a CPU 301 executes an OS, general application programs, and the like stored in program ROM of ROM 303 or loaded from an HDD 311 into RAM 302. The ROM 303 also has font ROM and data ROM. The RAM 302 functions as main memory, a work area, and so on for the CPU 301. A keyboard controller (KBC) 305 controls inputs from a keyboard, a pointing device (not shown), or the like. A display controller (CRTC) 306 controls a display made in a display unit (CRT) 310. Of course, the display unit 310 does not have to be a CRT. A disk controller (DKC) 307 controls access to and from the HDD 311 and the like that store boot programs, various types of applications, font data, and the like. A network controller (NIC) 312 is connected to a network and executes processing for controlling communication with other devices connected to the network. A bus 304 connects the CPU 301 with the RAM 302, the ROM 303, various types of controllers, and the like, and carries data signals, control signals, and the like.

Note that in the case of a mobile terminal, the configuration may include a touch panel controller or the like instead of the keyboard controller (KBC) 305. A high-capacity storage apparatus that takes the place of the HDD 311 may be included as well. Furthermore, the internal configuration of the network controller (NIC) 312 differs depending on whether the apparatus includes a wired LAN, a wireless LAN, or both. However, these internal configuration differences are hidden inside the network controller (NIC) 312, and the configuration is such that the system can be controlled in an equivalent manner by the other modules illustrated in FIG. 3.

Programs of Image Forming Apparatus

FIG. 4 is a diagram illustrating programs of the image forming apparatus 104. These programs are stored in the ROM 207, and are read out and executed by the controller unit 205 of the image forming apparatus 104.

A boot loader 401 is a program that is executed immediately after the power of the image forming apparatus 104 is turned on. This program includes programs for executing various types of startup sequences required to start up the system.

An operating system 402 is a program for providing an execution environment for various types of programs that implement the functions of the image forming apparatus 104. This mainly provides functions such as managing the resources of the memory of the image forming apparatus 104, i.e., the ROM 207, the RAM 208, the HDD 209, and the like, basic input/output control of the various other units illustrated in FIG. 2, and so on.

A network control program 403 is a program that is executed when sending and receiving data to devices connected over a network. This program is used when executing various types of processing such as receiving files to be printed, sending data from external apparatuses, sending and receiving commands, sending digital data generated as a result of inspection by the inspection unit 214, and the like. The network control program also includes a driver program for controlling the external I/F unit 202.

A data receiving program 404 is a program for receiving various types of instructions and information from the information processing apparatus 102. The information and instructions to be received by the program include print data.

A data sending program 405 is a program for sending information to the information processing apparatus 102. The information to be sent by the program includes the inspection result data generated as a result of the inspection by the inspection unit 214.

A print job management program 406 is a program that executes a print function executed by the controller unit 205 in response to instructions from the external I/F unit 202 when print job data is received by the image forming apparatus 104 via the external I/F unit 202. In this print function, the controller unit 205 sequentially instructs the devices illustrated in FIG. 2 to operate in an appropriate order on the basis of a processing order and processing conditions described in the program. The result is that printing processing is ultimately controlled to be executed. The "devices" mentioned here include the sheet processing apparatus 210, the printer unit 203, the HDD 209, the compression/decompression unit 206, the RAM 208, and the like. Program processing such processing for analyzing the print data received via the external I/F unit 202, processing for determining whether or not incorrect settings are included as a result of the analysis processing, changing settings to eliminate the incorrect settings, and the like are including as well.

A print data management program 407 executes print data expansion processing executed by the controller unit 205, as well as the printing function, when image data to be printed is received by the image forming apparatus 104 via the external I/F unit 202. The controller unit 205 sequentially instructs the devices illustrated in FIG. 2 to operate in an appropriate order on the basis of a processing order and processing conditions described in the program. The result is that PDL printing processing is ultimately controlled to be executed. The "devices" mentioned here include the sheet processing apparatus 210, the printer unit 203, the HDD 209, the compression/decompression unit 206, the RAM 208, and the like. In addition, the print data management program according to the present embodiment is configured to operate together with the print job management program 406 according to various types of instructions when executing print processing.

A media management program 408 is a program for executing a management function related to the sheets which can be used by the image forming apparatus 104. Sheet-related information managed by this program is stored in the HDD 209.

An inspection program 409 is a program for controlling the inspection unit 214 to inspect an output result image and generate the inspection result data. The inspection result data generated by the program is sent to the information processing apparatus 102 by the data sending program 405.

Programs of Information Processing Apparatus in Printing Business System

FIG. 5 is a diagram illustrating an example of the configuration of programs of the information processing apparatus 102 in the printing business system 100.

A boot loader 501 is a program that is executed immediately after the power of the information processing apparatus 102 is turned on. These programs include programs for executing various types of startup sequences required to start up the system.

An operating system 502 is a program for providing an execution environment for various types of programs that implement the functions of the information processing apparatus 102. This provides functions such as managing the resources of the memory of the information processing apparatus, i.e., the ROM 303, the RAM 302, the HDD 311, and the like.

A network control program 503 is a program that is executed when sending and receiving data to devices connected over a network. In other words, this program is used when sending print job data to the image forming apparatuses 103 and 104 and instruction print processing to be performed. The program is also used when instructing the varnish coater 105 to apply a decorative treatment to a printed product. The program is further used when instructing the adhesive binding device 106 to perform post-processing on a product. The program is also used when instructing the image forming apparatuses 103 and 104 to execute inspection using the inspection unit 214. The program is also used when receiving the quality report data from the inspection unit 214 via the data sending program 405.

A web server 504 is a server program for allowing an external device connected over a network to use a web service. There are a variety of conceivable services provided by the web server 504. In the present embodiment, the web server 504 is used for the printing business system 100 to receive submitted data, which is the subject of an order, from the customer system 109. The submitted data may include quality requirement information in addition to the data to be printed (called "print data" or "document data"). The quality requirement information may be in PRX format, or in another format. The web server 504 is also used to provide the customer system 109 with PQX information, which is a quality report for confirming whether or not quality requirements set for the printing business by the customer when the data is submitted have been met. Specifically, the web server 504 provides, via a web browser in a client device, a user interface for receiving the submitted data in the user interface for providing the PQX.

A workflow control program 505 is a program for centrally managing processing, control, job execution, and the like among devices connected over the network 101 within the printing business system 100, and serves as the core of the printing business system 100. When a plurality of processes, i.e., a plurality of apparatuses, are used to manufacture a product, control of the order of execution thereof, the execution of jobs, and the like is performed. The workflow control program 505 also controls the selection and switching of apparatuses to be used, recovery production, and the like. The workflow control program 505 also executes processing for issuing various types of instructions to an operator working within the printing business system 100. The workflow control program 505 also has a submitted data difference extraction function, which compares print settings (print setting information) and quality requirements (quality requirement information) included in a plurality of pieces of submitted data. The processing performed by this function will be described in detail with reference to FIG. 12.

A submission system program 506 is software that is mainly responsible for holding and managing data, for which a request for production has been received from the customer system 109, within the printing business system 100. The program is also used in cooperation with the web server 504 to electronically execute various types of functions required for ordering and receiving operations, e.g., a series of processing including sending data, issuing invoices, and the like, between the customer system 109 and the printing business system 100. Although any specification can be used for the communication between the customer system 109 and the printing business system 100, a system which supports PrintTalk is widely used as a standard specification.

A submitted data management program 507 is a program that manages submitted data received by the submission system program 506. The submitted data management program 507 according to the present embodiment manages the submitted data using a quality requirement identifier and version information included in the submitted data. The submitted data management program has a submitted data search function that searches out and returns the newest version of submitted data (including the quality requirement information) having a specified identifier.

A quality report creation program 508 is a program for creating, for the customer system 109, a quality report indicating whether a product meets quality conditions specified by the quality requirement information. The quality report creation program 508 creates the quality report upon receiving an instruction from the workflow control program 505. The quality report creation program 508 receives and stores the inspection result data from the image forming apparatuses 103 and 104, or other apparatuses in the printing business. The program then converts the data into quality report data, and provides that data to the customer system 109, at an appropriate timing. The "appropriate timing" may be periodically, a requested point in time, or the like. The quality report creation program 508 also has a quality difference highlighting function that creates the quality report distinguishing amongst inspection results pertaining to inspections specified by the submitted data difference extraction function of the submitted data management program 507. This function will be described in detail with reference to FIG. 13.

In the present embodiment, the customer system 109 receives a request via the web server 504 when receiving the quality report data from the printing business system 100. A response to the received request is then sent through the quality report data. However, as another form, the quality report data may be sent to the customer system 109. Alternatively, the quality report creation program 508 may run on the web server 504 as web content.

Programs of Information Processing Apparatus in Customer System

FIG. 6 is a diagram illustrating an example of the configuration of programs of the information processing apparatus 110 in the customer system 109.

A boot loader 601 is a program that is executed immediately after the power of the information processing apparatus 110 is turned on. These programs include programs for executing various types of startup sequences required to start up the system.

An operating system 602 is a program for providing an execution environment for various types of programs that implement the functions of the information processing apparatus 110. This provides functions such as managing the resources of the memory of the information processing apparatus, i.e., the ROM 303, the RAM 302, the HDD 311, and the like.

A network control program 603 is a program that is executed when sending and receiving data to apparatuses connected over a network. In other words, the program is used when sending and receiving data to and from the printing business system 100 via the Internet 108. The program is also used in rendering/display processing, data sending/receiving processing, and the like performed using a web browser (described later).

A web browser 604 is a client program used to access web services provided by external systems connected over a network. There are a variety of conceivable services used by the web browser 604. In the present embodiment, the web browser 604 is used to issue, to the printing business system 100, a request to submit the data that is to be ordered. The web browser 604 is also used to obtain PQX information, which is a quality report for confirming whether or not quality requirements set for the printing business by the customer when the data is submitted have been met.

A print data creation program 605 is a program for creating data to be printed when the customer system 109 requests production from the printing business system 100. PDF (Portable Data Format), PS (PostScript), and the like are widely used as print data, and there are various applications that create such data.

A quality requirement creation program 606 is a program for creating information for communicating quality requirement items of a generated product in a predetermined format when the customer system 109 requests production from the printing business system 100. The specific content of the quality requirements specified by the program, the method for setting the content, and the created data format will be described later.

A print setting creation program 607 is a program for creating information for communicating the format of a product to be produced, job execution conditions used at the time of production, job settings, and the like in a predetermined format when the customer system 109 orders production from the printing business system 100. The specific content of the setting information and the like specified by the program, the method for setting the content, and the created data format will be described later.

A submitted data sending program 608 is a program used for sending the quality requirements, print settings, and print data created by the quality requirement creation program 606, the print setting creation program 607, and the like to the printing business system 100.

A quality report receiving program 609 is a program used by the customer system 109 to receive, from the printing business system 100, the quality report data in a predetermined format, created by the quality report creation program 508 in the printing business system 100.

Printed Material Creation/Inspection Sequence

Figure 7B:
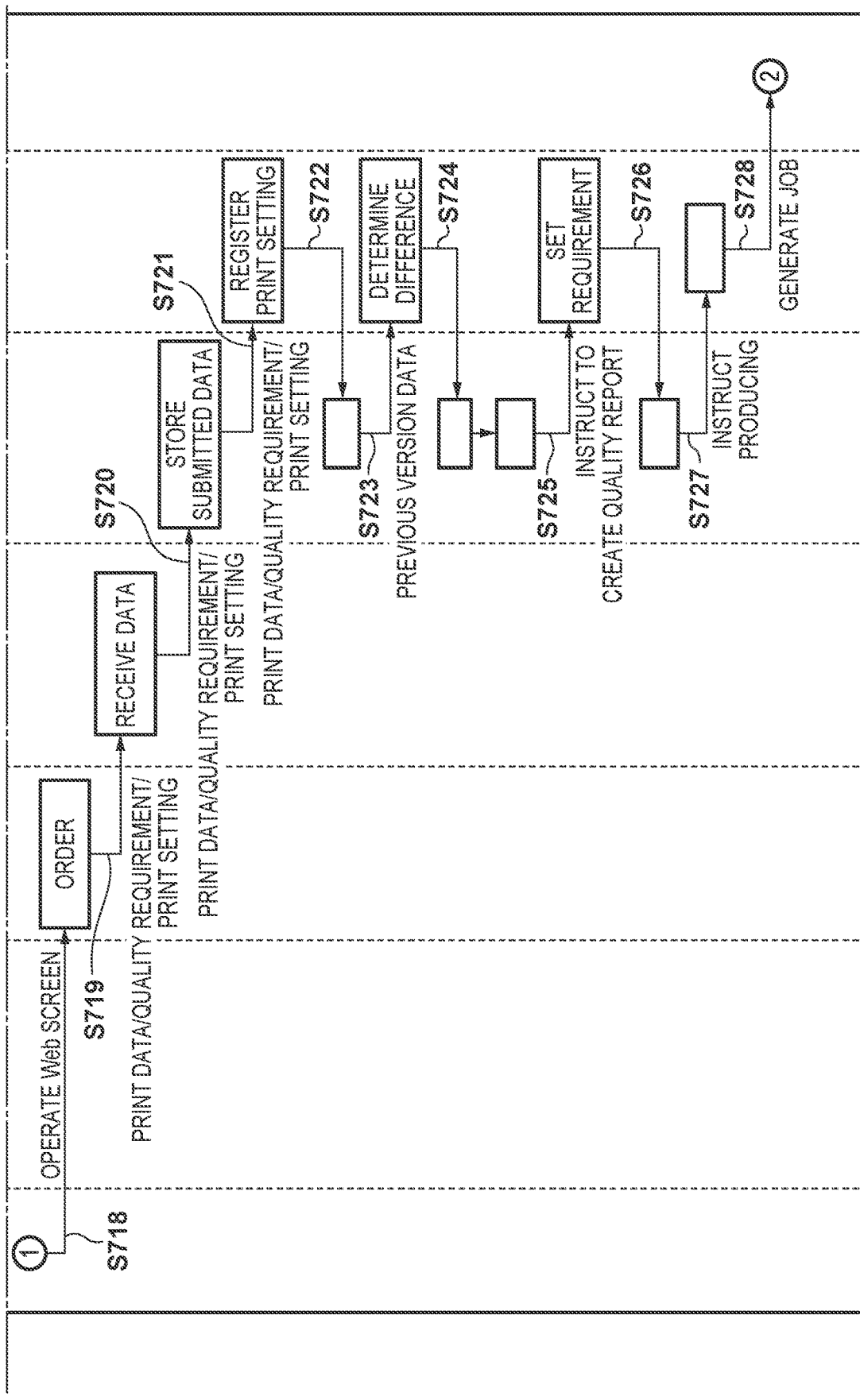

FIGS. 7A to 7C are system flow diagrams illustrating operations performed when the customer system 109 and the printing business system 100, as well as the customers who are operators of the systems, i.e., users, use the functions provided by the systems. A user 701 is a user of the information processing apparatus 110 in the customer system 109. Note that FIGS. 7A to 7C illustrate two parts of a continuous sequence, and will therefore be described as a single drawing.

The following will describe flow of control for sending and receiving between the systems throughout user operations 702 that are performed by the user 701 and in the systems for the information processing apparatuses 110 and 102 and the image forming apparatus 104, when the functions provided by those systems are provided to user 701. However, if it is necessary to perform processing while a plurality of subsystems interact with each other within each system, the flow will be described at the level of those subsystems.

A subsystem of the user 701 is the user operations 702. This includes operations performed by the user to realize the serial flow illustrated in FIGS. 7A to 7C. User operations 702 indicates the details and results of operations made through the screens provided by the web browser 604, the print data creation program 605, the quality requirement creation program 606, and the print setting creation program 607, which are a data creation application section 703.

The information processing apparatus 110 of the customer system 109 is broken down into two subsystems. These are the two subsystems indicated under "data creation application section 703" and "web browser section 704". The data creation application section 703 is realized by the CPU 301 executing the quality requirement creation program 606 and the print setting creation program 607. The web browser section 704 is realized by the CPU 301 executing the web browser 604.

The information processing apparatus 102 of the printing business system 100 is broken down into three subsystems.

These are the three subsystems indicated under "web server section 705", "submission system section 706", and "workflow control section 707".

The web server section 705 is realized by the CPU 301 executing the web server 504. The submission system section 706 is realized by the CPU 301 executing the submission system program 506 and the submitted data management program 507. The workflow control section 707 is realized by the CPU 301 executing the workflow control program 505 and the quality report creation program 508.

The image forming apparatus 104 has "print control section 708" as a subsystem. The print control section 708 is realized by, for example, the controller unit 205 executing the print job management program 406, the inspection program 409, and the like illustrated in FIG. 4.

Assuming the configuration described above, the flow progresses in the following manner, for example. In step S709 of FIG. 7A, the user 701 instructs the printing business system 100 to create the data which is to be ordered. Specifically, the print data creation program 605 accepts operations corresponding to the instructions made in this step, and various types of processing for creating the desired print data are executed. The created print data is depicted in FIG. 7A as being provided to the user operations 702, but the data may be stored in a location accessible to the user. The same applies to the other data as well.

After the creation of the desired print data is completed in step S710, in step S711, the user 701 further instructs the printing business system 100 to create the quality requirement data for the product to be ordered. Specifically, the quality requirement creation program 606 accepts operations corresponding to the instructions made in this step, and various types of processing for creating the desired quality requirements are executed.

After the creation of the desired quality requirements is completed in step S712, in step S713, the user 701 further instructs the printing business system 100 to create a job ticket for the product to be ordered. Specifically, the print setting creation program 607 accepts operations corresponding to the instructions made in this step, and various types of processing for creating the desired print settings are executed. The "job ticket" is data that describes, for example, the content of the job, the apparatuses that will execute the job, a quantity, the order in which operations will be performed, and the like. If it the job is a print job, the job may include the print settings, and if the job is post-processing or inspection, the job may include parameters thereof. This job ticket is sent to each apparatus according to an order of operations by the workflow control section 707, for example. The apparatuses that receive the job ticket execute processing such as printing, inspection, and the like according to the job ticket, in response to a predetermined trigger.

When the creation of the desired print settings is completed in step S714, the creation of all the submitted data to be submitted to the printing business is complete, and the subsequent steps therefore shift to processing for submitting the submitted data to the printing business.

In step S715, the user 701 operates the web browser section 704 and performs operations necessary for displaying an operation screen for submitting data to the printing business. In other words, the user 701 enters a URL for submission. In step S716, the web browser section 704 outputs an http request to the web server section 705 running on the information processing apparatus 102 on the basis of the input URL. The web server section 705 receives the http request and returns corresponding page information as a response in step S717.

In step S718 in FIG. 7B, the user 701 operates a submission screen that is displayed, and instructs the web browser section 704 to execute ordering processing.

Upon accepting the operations performed in step S718, in step S719, the web browser section 704 sends PDF, PRX, and JDF data, i.e., the submitted data, to the web server section 705. Upon receiving the submitted data, in step S720, the web server section 705 executes processing for storing each instance of submitted data in the submission system section 706.

Steps S721 and on are steps of production processing executed by the printing business system 100 for the submitted data. In other words, the workflow control section 707 generates and registers the job data of a job, such as a print job, required by the printing business system 100, on the basis of the submitted data stored in the submission system section 706. The "job data" is data of each individual job, and may be generated on the basis of, for example, job tickets or print data included in the submitted data. Of these, the print job corresponds to a job executed by the image forming apparatus 104, for example. Because the image forming apparatus 104 has the inspection function, the inspection executed by the image forming apparatus 104 may be included in the generated print job. Once the job registration processing is complete, in step S722, the submission system section 706 is queried as to whether a previous version of the same submission data exists, and if so, the quality requirements and job settings for the corresponding version are obtained. Here, it is assumed that the identifier and version information written in the quality requirements are used to identify the previous version of the submitted data.

In step S724, the workflow control section 707 compares the current submitted data with the previous submitted data obtained in step S723, identifies changes in the quality requirements and the print settings, and identifies inspections affected by the changes. This processing will be described with reference to FIG. 12.

Once the steps described above are complete, all preparations for the start of production are ready. Accordingly, in step S725, the submission system section 706 instructs the workflow control section 707 to start production, i.e., the job execution processing. The workflow control section 707 generates a print job for the print control section 708, which is a constituent element of the image forming apparatus 104 (step S726).

In response to the instruction in step S727, the print control section 708 starts the print processing.

In step S729, the inspection unit 214 executes the inspect, and in step S730, sends the inspection result to the workflow control section 707.

In step S730 in FIG. 7C, the workflow control section 707 identifies, from the inspection result received in step S729, inspection-related items that are affected by the changes in the submitted data, identified in step S724. Then, a quality report is created so that the results related to the inspection can be distinguished from others. The processing performed at this time will be described with reference to FIG. 13. Additionally, an example of the quality report created here will be described with reference to FIG. 15.

In step S731, the workflow control section 707 registers the created quality report in the web server. "Registering in the web server" may be storing quality report information in a predetermined storage location. The quality report information can be directly or indirectly displayed in the web browser section 704 by the web browser section 704 accessing a predetermined URL.

The foregoing has described the flow of operations related to the processing for producing the data submitted from the customer system 109, and creating the requested quality report, performed by the printing business system 100. The example shown here is an inspection performed by an inspection section 904 of the image forming apparatus 104. However, even when the inspection is performed by an independent inspection apparatus, the inspection is performed in the same manner and the result thereof is sent to the workflow control section 707.

In step S740, the user 701 executes processing for obtaining the quality report data in order to confirm the quality status during the production of the submitted data. In other words, the user 701 accesses the web browser section 704 and enters information necessary for obtaining the information of the quality report, such as a URL. In step S741, the http request is sent from the web browser section 704 to the web server section 705, and corresponding response information is returned in step S742. In step S743, the user operates a web screen returned in step S742 and instructs the web browser section 704 to obtain the quality report. In response, the http request is sent to the web server section 705 (step S744), and the quality report data is sent to the user as a response to the step.

Functional Module Configuration

Figure 8A:
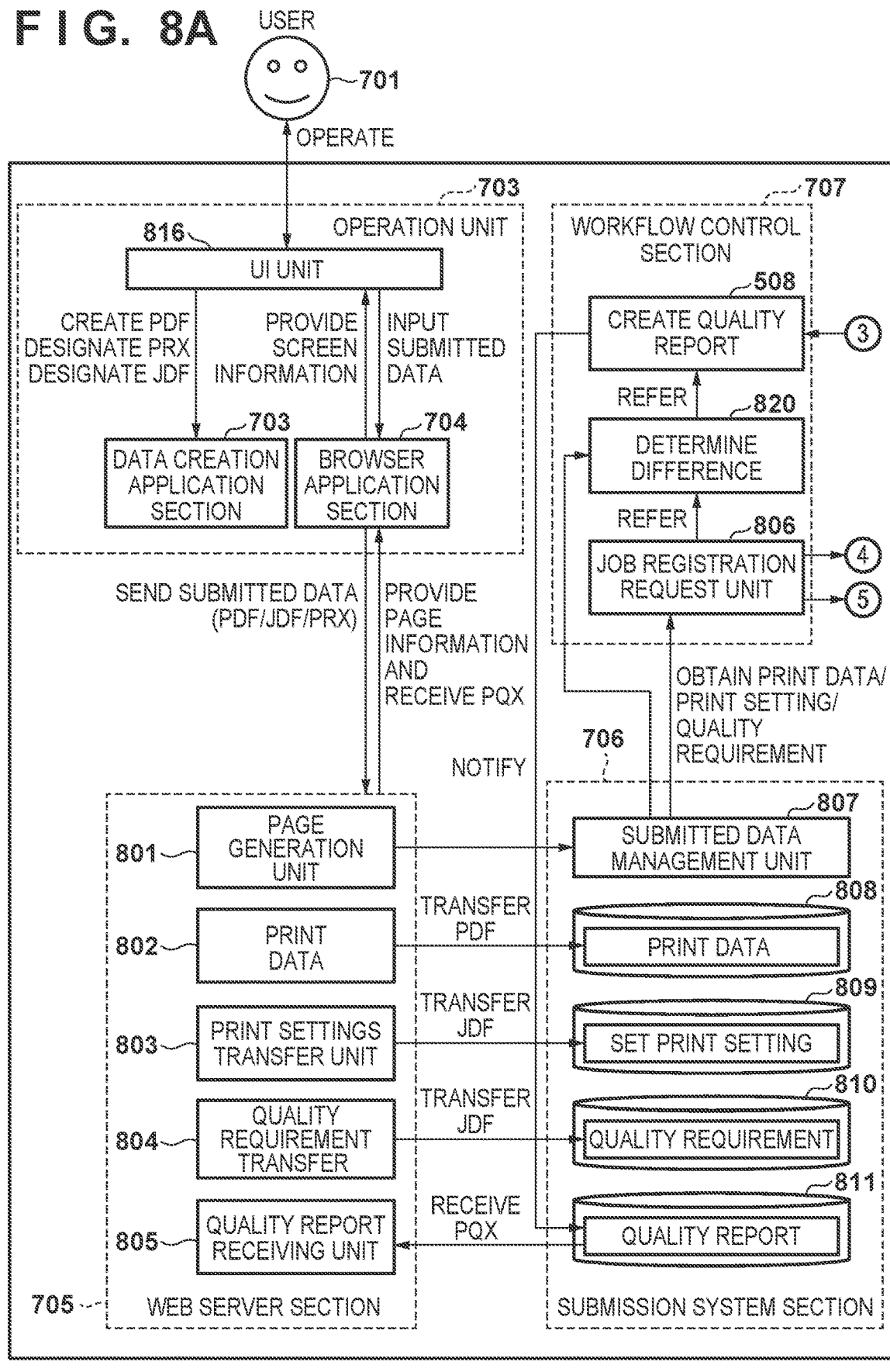
FIGS. 8A and 8B are detailed block diagrams illustrating, in detail, the system configuration of the print processing system as a whole.
Figure 8B:
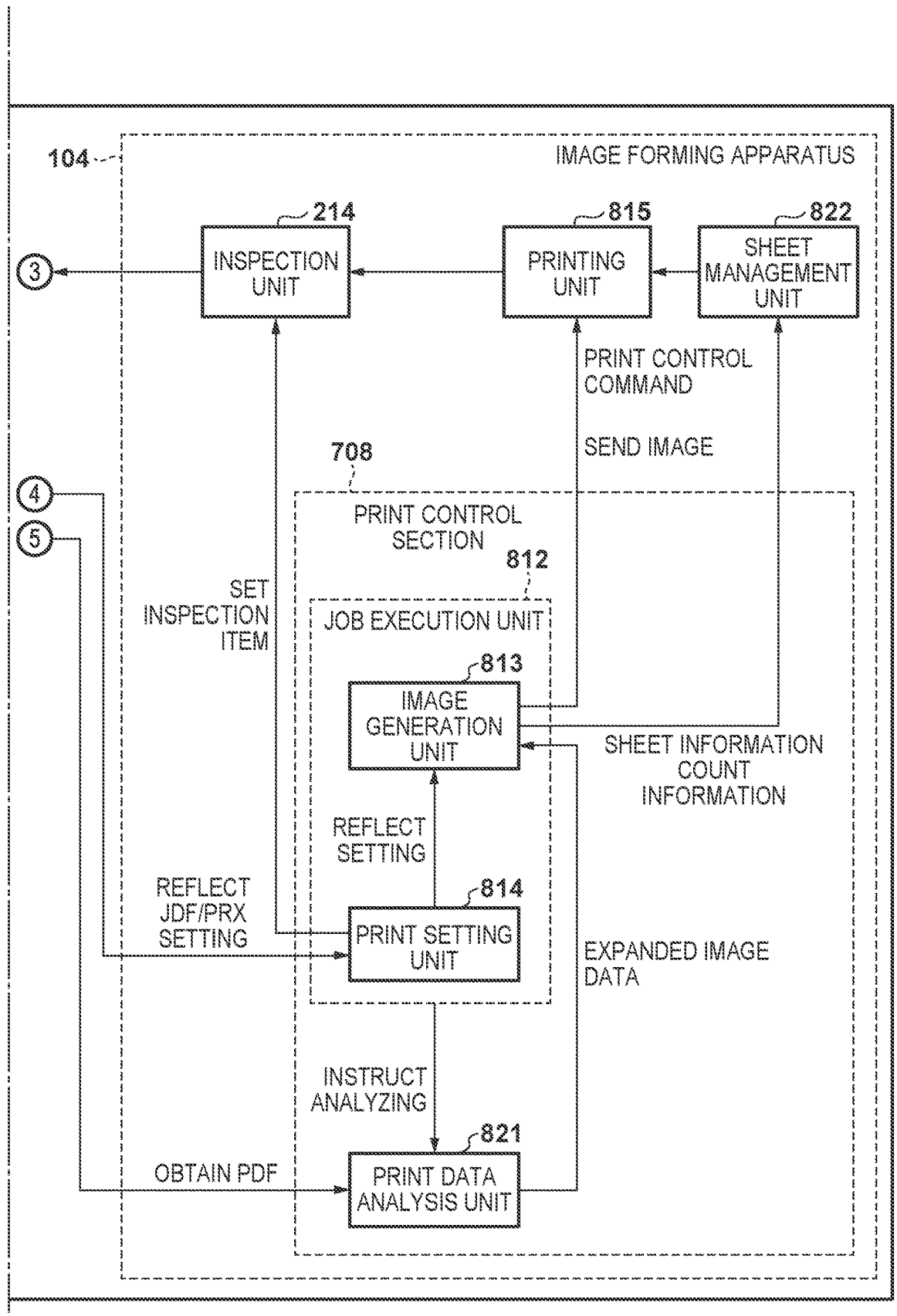

FIGS. 8A and 8B are system configuration diagrams illustrating the processing handled by, and the relationships between the functions, of functional modules constituted by the customer system 109 and the printing business system 100 which constitute the system and the user 701 who is the operator thereof. Each unit will be described in detail hereinafter. Note that FIGS. 8A and 8B are two parts of a divided drawing, and will therefore be described as a single drawing hereinafter.

A UI unit 816 is a functional unit provided in order to provide means for displaying image information and accepting data input/output instructions and operation instructions. Instructions are made from the UI unit 816 to the data creation application section 703 and a browser application section 704. Note that the browser application section 704 in FIG. 8A is the same as the web browser section 704 in FIGS. 7A to 7C.

The data creation application section 703 is a section for creating and specifying print data, quality requirements, and print settings.

The browser application section 704 is a functional unit that handles processing of presenting screen information by displaying web content in a window screen, which is displayed in the UI unit 816. The browser application section 704 presents various types of screen information, transfers data to be printed, and the like by performing processing for sending and receiving information to and from the web server section 705 (described later). Through this, a series of functions for submission and quality requirements/reports between the customer system 109 and the printing business system 100 can be provided to the user.

The web server section 705 is a functional unit that provides, to an external apparatus, a web service of the information processing apparatus 102 in the printing business system 100. The web server section 705 executes a series of processing for receiving various types of requests from the external apparatus, i.e., requests, executing processing according to the details thereof, and responding to the exterior in the form of page information. A page generation unit 801 handles the generation of the page information in accordance with the details of the request. The page generation unit 801 also makes it possible to issue instructions to execute submission processing to a submitted data management unit 807 of the submission system section 706.

A print data transfer unit 802, a print settings transfer unit 803, and a quality requirement transfer unit 804 transfer the print data, the print settings data, and the quality requirement data, which are the submitted data sent from the browser application section 704, to a print data storage unit 808, a print settings data storage unit 809, and a quality requirement data storage unit 810, respectively. Note that the reference signs of the respective pieces of data may be indicated by the reference signs of the corresponding storage units. Additionally, a quality report receiving unit 805 executes processing for receiving the quality report data created by a quality report creation unit 817 (described later).

The submission system section 706 is a functional unit that provides, to an external apparatus, a service pertaining to submission processing, of the information processing apparatus 102 in the printing business system 100. The submitted data management unit 807 makes a request for each instance of submitted data to a job registration request unit 806 of the workflow control section 707, and instructs the image forming apparatus 104 to execute the print job. Additionally, in response to a request from a difference determination unit 820 of the workflow control section 707, the submitted data management unit 807 searches for submitted data managed using the same identifier as the identifier written in the quality requirement provided from the workflow control section 707. If the search results in applicable submitted data, the quality requirement data and the print setting data of that submitted data is provided. Note that if the version is specified at the same time as the identifier, versions older than the specified versions are searched for, and the most recent version of the corresponding submitted data is provided. If the version is not specified, the most recent submitted data found in the search is provided.

The workflow control section 707 is a functional unit that provides a workflow function of the information processing apparatus 102 in the printing business system 100. The various types of apparatuses illustrated in FIG. 1 are connected over the network 101 under the control of the workflow control section 707. These apparatuses are under the control of the workflow control section 707, which instructs the operations of each apparatus and the execution of jobs and the like, and in this manner, the printing business system 100 operates as a whole. The workflow control section 707 includes the job registration request unit 806 which manages jobs processed by each of the apparatuses in the printing business system 100, a quality report creation unit 508 that generates a quality report from the inspection result of a product produced as a result of executing a job, and the difference determination unit 820. The difference determination unit 820 compares two specified instances of print setting data and two specified instances of quality requirement data to identify differences.

The quality report creation unit 508 identifies an inspection that is affected by the differences in the submitted data detected by the difference determination unit 820 by referring to an inspection effect table, and generates a quality report so that the results of the identified inspection can be distinguished. The inspection effect table is read out and stored in the RAM 302. An example of the inspection effect table will be described with reference to FIG. 14. Note that the quality report creation unit 508 is realized by executing the quality report creation program 508 illustrated in FIG. 5.

The image forming apparatus 104 can be broadly divided into the print control section 708, a sheet management unit 822, a printing unit 815, and the inspection unit 214.

The print control section 708 further includes a job execution unit 812 and a print data analysis unit 821. The print data analysis unit 821 is realized by executing the print data management program 407 illustrated in FIG. 4, for example. The job execution unit 812 is constituted by an image generation unit 813 and a print setting unit 814. The print setting unit 814 receives job data sent from the job registration request unit 806, i.e., print data 808, print setting data 809, and quality requirement data 810. The print setting unit 814 then instructs the image generation unit 813 to perform image generation processing, and instructs the print data analysis unit 821 to perform analysis processing on the received print data 808. Additionally, the print setting unit 814 instructs the inspection unit 214 to perform inspections for the quality requirement items of PRX 810, which are requested for the product to be generated. The print data analysis unit 821 then sends intermediate data (not shown) generated after the analysis to the image generation unit 813, and executes the subsequent image forming processing. In other words, the sheet management unit 822 instructs the size and type of the sheet to be used for the print processing to be counted, and the printing unit 815 performs processing for forming, on the sheet, an image of the intermediate data (not shown) generated after the analysis. Furthermore, the inspection unit 214 performs the inspection processing on the image on the sheet, generated by the printing unit 815, and registers a result of the inspection in the quality report creation unit 817.

Image Forming Mechanism

Figure 9A:
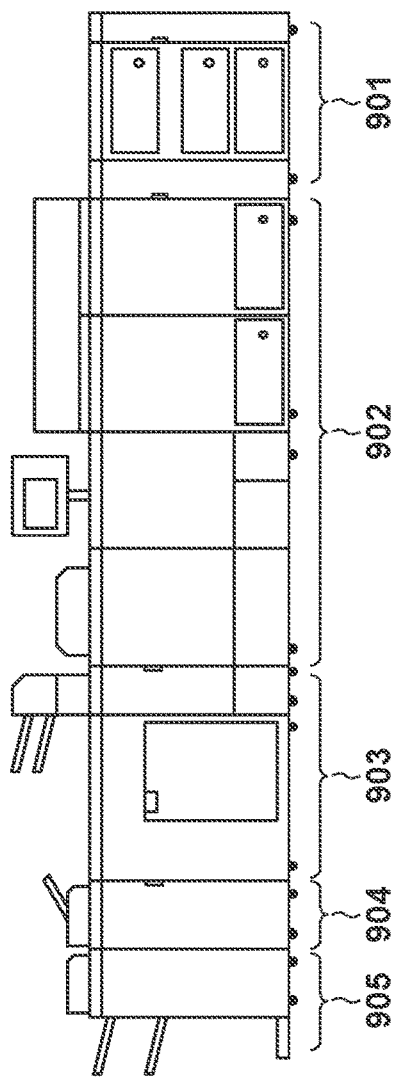
FIGS. 9A to 9C are diagrams illustrating the configuration and operating mechanism of an inspection apparatus of the image forming apparatus.
Figure 9C:
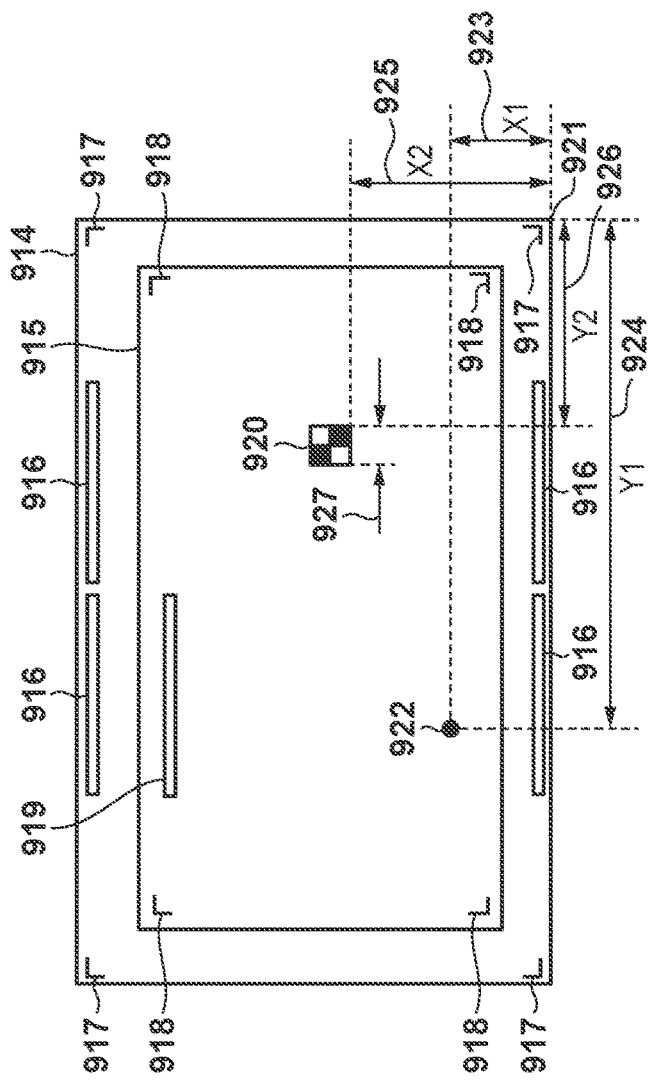
Figure 9B:
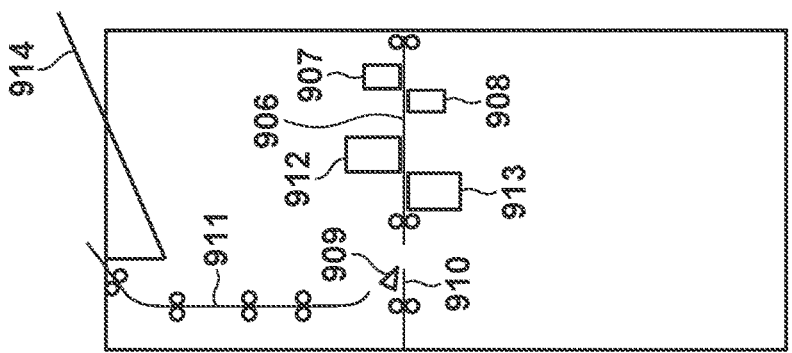

FIGS. 9A to 9C are diagrams illustrating the configuration of the inspection apparatus among the configurations in the image forming apparatus 104, as well as the method and mechanism of the inspections performed by the inspection apparatus.

FIG. 9A is a schematic diagram illustrating the arrangement and connection states of the modules constituting the image forming apparatus 104 and the sequential relationships between sheet transport paths. A paper feed section 901 is mounted adjacent to an image forming section 902. An intermediate processing section 903 is connected to the opposite side of the paper feed section 901. The intermediate processing section 903 corresponds to, for example, an inserter used to insert inserted paper at a specific location of the product being produced, a cooling apparatus for cooling heat on the sheet produced when fixing processing is performed in the image forming section 902, or the like. The inspection section 904 is attached at a stage after the intermediate processing section 903. The configuration of the inspection section 904 will be described in detail later.

A post-processing section 905 is further attached to a rear end of the inspection section 904. In the post-processing section 905, processing is performed on the sheets after printing, such as binding processing including stapling, perforation processing including punching, and the like.

The type, number, and connection order of the apparatuses constituting the image forming apparatus 104 illustrated in FIG. 9A are merely examples, and are not limited to the examples illustrated in FIG. 9A.

FIG. 9B is a schematic diagram illustrating the internal configuration of the inspection section 904. A sheet which has been printed onto is transported to a transport path 906 from an apparatus corresponding to the inspection section 904 in the previous stage. A first inspection unit 907 and a second inspection unit 908 for inspecting the image information formed on the transported sheet are located above and below the sheet, respectively. This is a configuration used to inspect the images formed on the front surface and the back surface of the sheet at the same time. The first inspection unit 907 and the second inspection unit 908 according to the present embodiment are constituted by contact image sensors arranged parallel to a main scanning direction with respect to the sheet being transported in the transport path 906. In other words, the first inspection unit 907 and the second inspection unit 908, which are constituted by contact image sensors, continuously read the image on the sheet, which is transported along the transport path 906, in the main scanning direction, in accordance with the transport speed of the sheet. This makes it possible to obtain image information of a flat surface formed on the sheet with a high level of accuracy. In other words, the first inspection unit 907 and the second inspection unit 908 are capable of inspecting image information formed on the sheet, including detecting image defects such as image misalignment and soiling, barcode reading accuracy, and the like.

A third inspection unit 912 and a fourth inspection unit 913 are disposed in the transport path 906 in stages after the first inspection unit 907 and the second inspection unit 908. The third inspection unit 912 and the fourth inspection unit 913 are spectral colorimeters. Like the first inspection unit 907 and the second inspection unit 908, these units are arranged above and below the transport path 906, respectively, so that the front surface and the back surface of the sheet can be inspected at the same time. The third inspection unit 912 and the fourth inspection unit 913 accurately inspect color information of the image at a specific location on the sheet transported along the transport path 906.

The sheet that has passed through the first to fourth inspection units 907, 908, 912, and 913 is further transported in one of the two directions described below, depending on the position of a flapper 909. In other words, the sheet is transported via a transport path 910 to the post-processing section 905, which is further to the end of the inspection section 904. If the transported sheet is not part of the product, but is instead an additional test print sheet for the purpose of confirming color, image conditions, and the like, it is better to prevent that sheet from being mixed into the product. Therefore, the inspection section 904 can also control the position of the flapper 909 so that the sheet is transported to a transport path 911 and guided to a discharge tray 914.

FIG. 9C illustrates an example of image information on a sheet to be inspected by the first to fourth inspection units 907, 908, 912, and 913 included in the inspection section 904. Each image element to be formed on the sheet will be described below.

A register mark 917 is a marker used to inspect whether the image is correctly formed at a specified position on the sheet. This image information is read by the first inspection unit 907 and the second inspection unit 908. Even if the register mark 917 is not included in image information 915 of PDF data submitted to the image forming apparatus 104, the image forming apparatus 104 can form an image having superimposed the register mark 917 on the PDF data.

Alternatively, the register mark may be included as image information in the submitted PDF data in advance, as in the case of a second register mark 918. In that case, the first inspection unit 907 and the second inspection unit 908 can read the register mark 918 included in the PDF data.

A color patch 916 is a patch image part for reading color information at a specified position on the sheet with a high level of accuracy using the third inspection unit 912 and the fourth inspection unit 913. As with the register mark 917, even if the color patch 916 is not included in image information 915 of PDF data submitted to the image forming apparatus 104, the image forming apparatus 104 can form an image having superimposed the color patch 916 on the PDF data. It is also possible to measure color by reading objects such as images and the like included in the PDF data. In this case, the data can be included as image information in the submitted PDF data in advance, as with a second color patch 919, or an image of the product itself can be used to measure the color instead of a color patch. By specifying the coordinates of the position of the image to be inspected in the inspection section 904, a printed part of the object to be measured can be read by the third inspection unit 912 and the fourth inspection unit 913.

An image defect 922 indicates a defective image part that is not included in the image information 915 of the submitted PDF data and that is produced by a defect in the image forming apparatus 104 or the sheet. The image defect 922 can also be detected by the first inspection unit 907 and the second inspection unit 908, and the position of the detected defect can be obtained as coordinates (X1 (923), Y1 (924)) relative to an origin 921.

User Interface for Submission

Figure 10B:
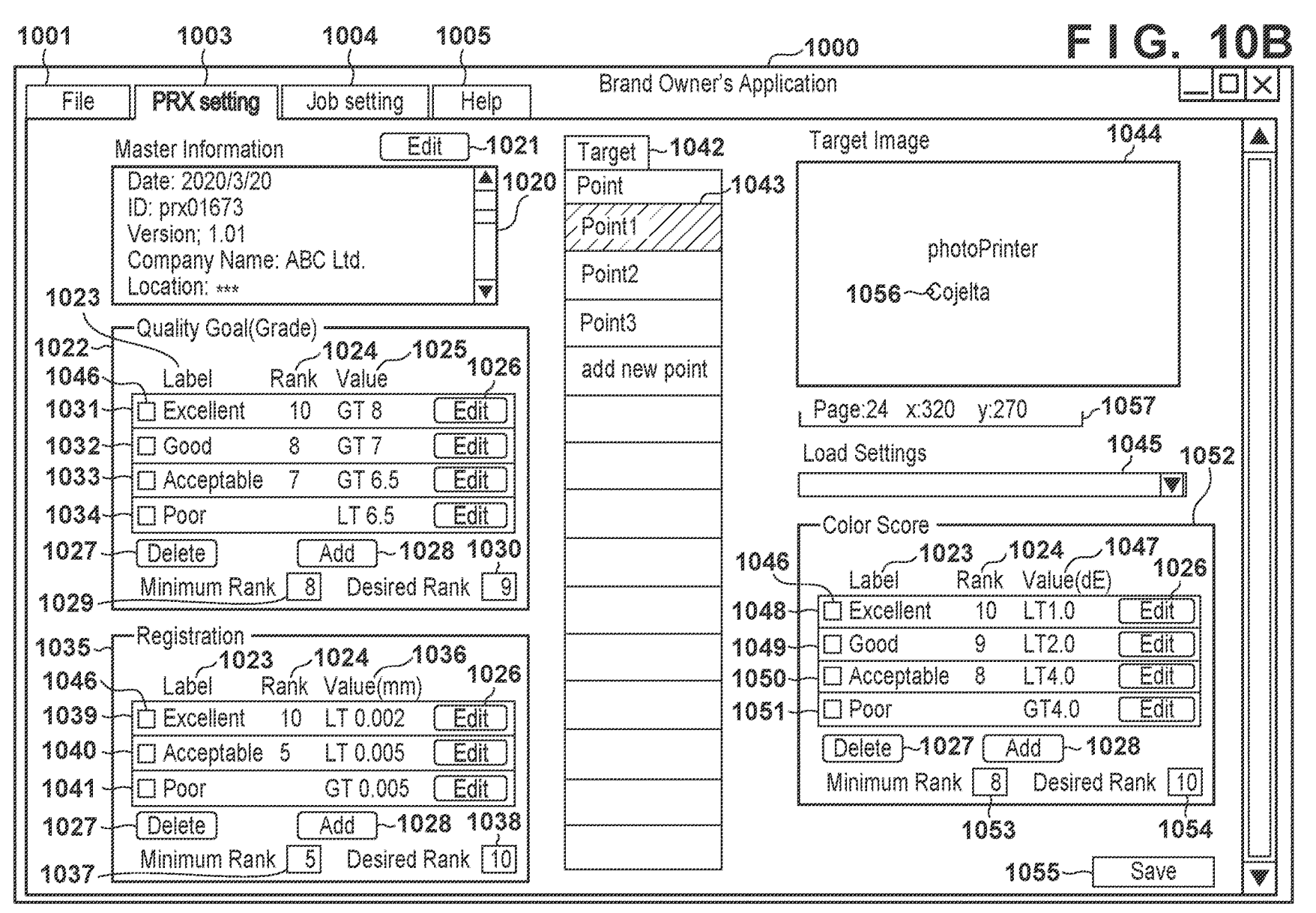
Figure 10C:
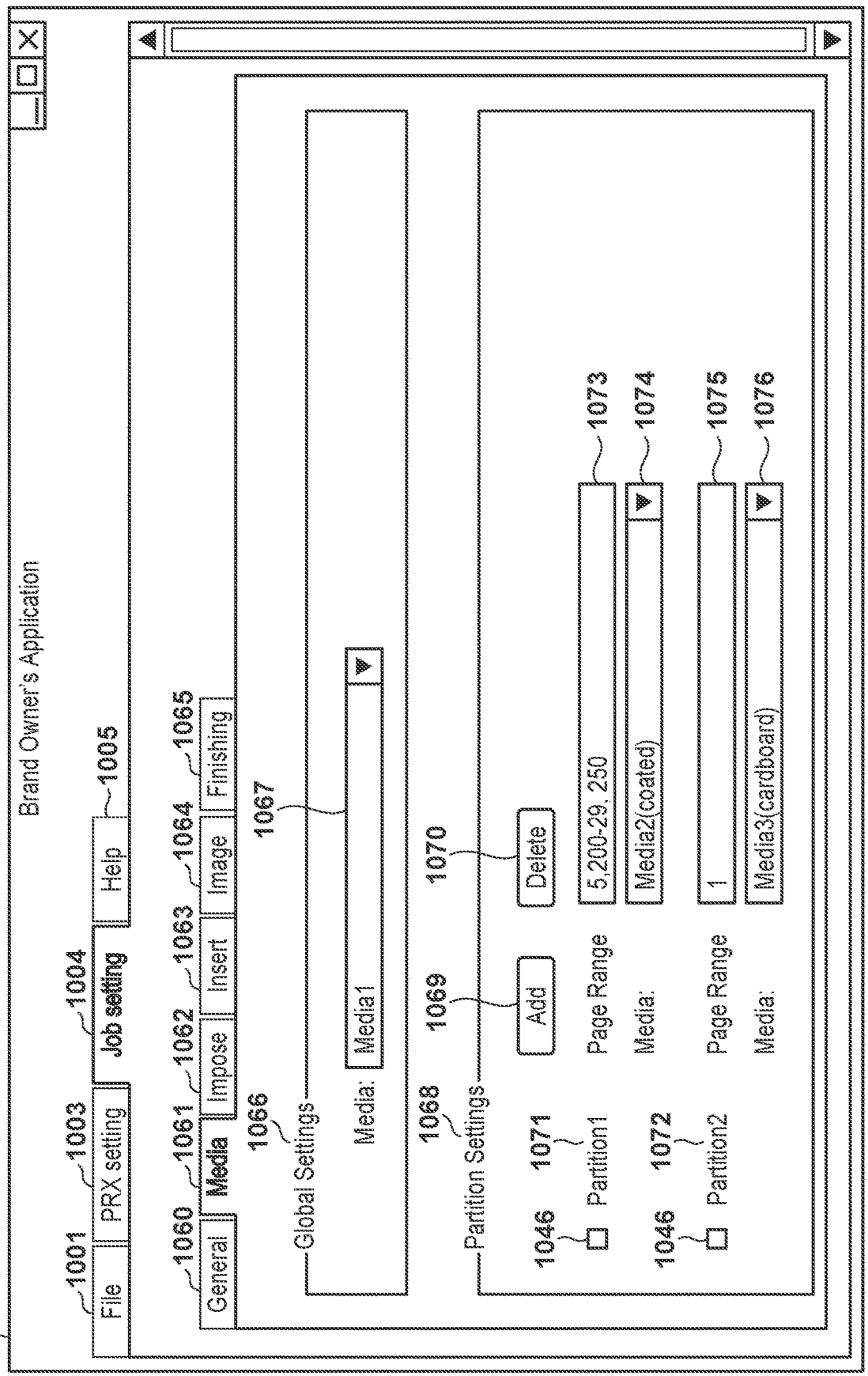

FIGS. 10A to 10C illustrate an example of an application screen displayed when the information processing apparatus 110 in the customer system 109 executes processing for submitting the quality requirement, the print settings, and the print data, which are the quality requirement data to be submitted, to the printing business system 100.

FIG. 10A illustrates an example of a screen 1000 displayed when providing a function for sending the submitted data to the printing business system 100 part of the functions of the application illustrated in FIGS. 9A to 9C. In other words, the system according to the present embodiment is configured so that the screen illustrated in FIG. 10A is displayed when a general function settings tab 1001 is selected.

A file selection tab button 1001 is a button for displaying a screen for selecting the print data. FIG. 10A illustrates a file selection screen in which the file selection tab button 1001 is selected. Likewise, a quality requirement creation tab button 1002 is a button for displaying a screen for creating quality requirements. A print settings creation tab button 1003 is a button for displaying a screen for making print settings to be used in the printing, such as paper, image processing, and the like. A help tab button 1004 is a button for displaying a screen explaining how to use the application. Only one of the file selection tab button 1001, the quality requirement creation tab button 1002, the print settings creation tab button 1003, and the help tab button 1004 can be selected at the same time, and when any one of the buttons is selected, the other tabs are deselected.

In the file selection screen, a destination information setting field 1005 is a part for specifying an address of the web service provided by the web server section 705 running on the information processing apparatus 102 as a means of submitting a file.

A print data display field 1006 and a print data selection button 1007 are both parts for selecting a file, which is the image data to be submitted, from the file system of the information processing apparatus 110 in the customer system 109.

When the print data required for submission is selected using the parts described above, the print settings and quality requirements are created as indicated in FIGS. 10B and 10C, and a sending instruction button 1008 is selected with the appropriate destination information set, a submission dataset is sent to the printing business system 100. A send cancel button 1009 is a part for canceling the submission processing itself.

User Interface for Quality Requirements

FIG. 10B illustrates an example of an application screen for creating quality requirements to be submitted in the information processing apparatus 110 of the customer system 109. This example will be described using PRX as the format of the quality requirement data. The screen illustrated in FIG. 10B is controlled to be displayed as a result of the quality requirement creation tab button 1002 being selected.

A master information setting part 1020 is a setting part for entering various types of master information required for creating the quality requirements. The master information corresponds to various types of information such as the date of the quality requirements, the identifier of the quality requirements, version information, company information, a name assigned to the requirement specifications defined by PRX, and the like. This information can be edited by pressing an edit master information button 1021.

An overall quality target setting part 1022 is a setting part that integrates one or more different types of quality requirement items to define an overall quality level. The overall quality is determined by rules such as those described below. In other words, the overall quality is defined as a combination of a label 1023, which is readable information assigned to a quality level, a rank 1024, which is quantitative numerical value information corresponding to the label 1023, and a value 1025, which specifies parameters and a formula for determining the rank 1024.

This will be described in detail below using a highest-level quality 1031 as a specific example. The label of the highest-level quality 1031 is defined as "excellent". The character string applied to this label 1023 can be set as desired by the user 701 using the application illustrated here and running on the information processing apparatus 110, i.e., the customer, in the customer system 109. In other words, this is information provided to enable the operator to easily determine the meaning of the quality level to be defined, and is different in nature from information used for control and the like.

On the other hand, the rank 1024 of the highest-level quality 1031 is defined as "10". This is a numerical value specified by the customer to quantitatively determine and control the quality of the products requested by the printing business, and is information intended to be used for control and the like. However, the numerical value of the rank 1024 itself can be specified as desired by the customer as a quantitative numerical value of the quality of the products of the customer itself.

FIG. 10B illustrates an example where the value 1025 for defining the rank 1024 of the highest-level quality 1031 is "GT 8". If the numerical value of a quantitative quality index found through a specified evaluation formula is 8 or higher, the rank 1024 of the highest-level quality 1031 is calculated to be 10, and the quality of the product is determined to be the highest-level quality.

Other quality levels are specified in such a way that ranks and labels of "good" 1032, "acceptable" 1033, and "poor" 1034 are determined first by the values calculated using the same numerical values and formulas. Note that the present embodiment employs a configuration in which each quality level allows editing of the information specified in a quality level editing part 1026.

The number of quality levels can be set as desired. In other words, a new quality level can be added to the overall quality target setting part 1022 by pressing a level addition button 1028 when specifying detailed levels as necessary. The configuration is such that a level for which a checkmark has been added can be deleted by a level deletion button 1027.

When the customer issues quality requirements to the printing business, acceptance conditions for the quality of the produced product are defined by the numerical value of the rank 1024, which in turn is defined by the quality level. The acceptance conditions are defined by a minimum acceptable quality setting part 1029 and a desired quality setting part 1030.

The minimum acceptable quality setting part 1029 is for the customer to define, for the printing business, a minimum value for the acceptable quality, i.e., the rank 1024, when the product is delivered. In other words, the quality requirement items can be communicated to the printing business to the effect that products with a numerical value for rank 1024 that is below the numerical value specified in the minimum acceptable quality setting part 1029, i.e., 8 in the example illustrated here, do not meet the acceptable quality.

The desired quality setting part 1030 is for the customer to define, for the printing business, a desired value indicating the desired quality conditions, i.e., the rank 1024, when the product is delivered. In other words, products with a numerical value for rank 1024 that is above the numerical value specified in the desired quality setting part 1030, i.e., 9 in the example illustrated here, can be communicated to the printing business as the quality requirement items.

In an image misalignment quality setting part 1035 as well, the customer specifies the acceptance conditions with respect to image misalignment quality in the produced product to the printing business through the numerical value of the rank 1024, which in turn is defined by the aforementioned quality level. The same applies to the overall quality target setting part 1022. The acceptance conditions pertaining to the image misalignment quality are defined by a minimum acceptable image misalignment quality setting part 1037 and a desired image misalignment quality setting part 1038.

The image misalignment quality setting part 1035 is a setting part for entering quality requirement information pertaining to the image misalignment of a product. Like the overall quality target setting part 1022, the configuration is such that the level of quality requirements pertaining to image misalignment can be specified by means of setting the label 1023 and the rank 1024.

An image misalignment quality value 1036 is specified on the basis of an amount of deviation from a reference position (length or distance between a reference image and the image in the product), which is a result of measuring the product with respect to the desired image misalignment. In other words, an example in which a highest-level quality 1039 for the image misalignment quality is an amount of deviation of less than or equal to 0.002 mm is illustrated here. In other words, an example in which the label 1023 for the highest-level quality 1039 is "excellent" and the rank is 10 is illustrated here. Likewise, an example in which "good" 1040 and "rejected" 1041 are defined in the same way for the image misalignment quality is illustrated here. Functions for adding and deleting ranks is realized by the same mechanism as that of the overall quality target setting part 1022 and will therefore not be described here.

The minimum acceptable image misalignment quality setting part 1037 is a setting part for the customer to define, for the printing business, a minimum value for the acceptable image misalignment quality, i.e., the rank 1024, when the product is delivered. The quality requirement items can be communicated to the printing business to the effect that products with a numerical value for rank 1024 that is below the numerical value specified in the minimum acceptable image misalignment quality setting part 1037, i.e., 5 in the example illustrated here, do not meet the acceptable image misalignment quality.

The desired image misalignment quality setting part 1038 is a setting part for the customer to define, for the printing business, a minimum value for the desired image misalignment quality conditions, i.e., the rank 1024, when the product is delivered. Products with a numerical value for rank 1024 that is above the numerical value specified in the desired image misalignment quality setting part 1038, i.e., 10 in the example illustrated here, can be communicated to the printing business as the image misalignment quality requirement items.

An inspection position specifying part 1042 is a part for specifying a position to be inspected. A position registered as an inspection position is displayed in the inspection position specifying part 1042. FIG. 10B illustrates a state in which a "Point1" button 1043, which is a button used to select a first inspection position "Point1", is selected. Inspection positions for Point2 and Point3 are registered as well, and an "add new point" button for registering a new inspection position is displayed as well. Any name can be given to the inspection position, and "Point1" is the name given to this inspection position. Although it is assumed that the specifying of the inspection position is performed by specifying the coordinates and page number of the file selected through the print data display field 1006 and the print data selection button 1007, the method for specifying the inspection position in the present disclosure is not limited.

An inspection position display area 1044 is an area for displaying the inspection position. Part or all of the file selected through the print data display field 1006 and the print data selection button 1007 is displayed in the inspection position display area 1044, and an inspection position superimposing display part 1056 indicating the specified inspection position is displayed superimposed over the print data. The inspection position is also expressed as coordinates and a page number of the print data, in an inspection position coordinate display part 1057.

A reference data selection button 1045 is a button for selecting reference data for comparison in order to evaluate the inspection result for an object selected in an object selection part 1042. Color reference data is selected in the case of color inspection. The reference data selection button 1045 can be selected only when a button corresponding to a reference value of one of the objects in the object selection part 1042 is selected. When the reference data selection button 1045 is selected, a file selection screen (not shown) is displayed, and a file can then be selected.

A color quality setting part 1052 is a setting part where quality requirement information pertaining to the color of the product is entered when creating PRX. Like the overall quality target setting part 1022, the configuration is such that the level of quality requirements pertaining to color can be specified by setting the label 1023 and the rank 1024.

A color quality value 1047 is specified on the basis of a color difference ("ΔE", also called "delta E") of a color value that is the result of measuring the color of the product for a required color. In other words, a highest-level quality 1048 for the color quality indicates an example where the color difference is 1.0 or less. That is, an example in which the label 1023 for the highest-level quality 1048 is "excellent" and the rank is 10 is illustrated here. Likewise, an example in which "good" 1049, "acceptable" 1050, and "rejected" 1051 are defined in the same way for the color quality is illustrated here. Functions for adding and deleting ranks is realized by the same mechanism as that of the overall quality target setting part 1022 and will therefore not be described here.

Like the overall quality target setting part 1022, in the color quality setting part 1052 as well, when the customer requests quality requirements with respect to color to the printing business, the acceptance conditions are defined by the numerical value of the rank 1024, which in turn is defined by the aforementioned quality level for the color quality of the produced product. The acceptance conditions are defined by a minimum acceptable color quality setting part 1053 and a desired color quality setting part 1054 pertaining to the color quality.

The minimum acceptable color quality setting part 1053 is for the customer to define, for the printing business, a minimum value for the acceptable color quality, i.e., the rank 1024, when the product is delivered. In other words, the color quality requirement items can be communicated to the printing business to the effect that products with a numerical value for rank 1024 that is below the numerical value specified in the minimum acceptable color quality setting part 1053, i.e., 8 in the example illustrated here, do not meet the acceptable color quality.

The desired color quality setting part 1054 is for the customer to define, for the printing business, a minimum value indicating the desired color quality conditions, i.e., the rank 1024, when the product is delivered. In other words, products with a numerical value for rank 1024 that is above the numerical value specified in the desired color quality setting part 1054, i.e., 10 in the example illustrated here, can be communicated to the printing business as the color quality requirement items.

User Interface for Print Settings

FIG. 10C illustrates an example of an application screen for creating or editing print settings to be submitted in the information processing apparatus 110 of the customer system 109. The screen illustrated in FIG. 10C is controlled to be displayed as a result of the print settings creation tab button 1003 being selected. The system according to the present embodiment is configured such that the print settings creation tab button 1003 can be used to select more detailed setting items, as illustrated in FIG. 10C. In other words, for each function to be set, there is a general setting tab 1060, a media setting tab 1061, an imposition setting tab 1062, an inserted paper setting tab 1063, an image processing setting tab 1064, a post-processing setting tab 1065, and the like.

The screen example illustrated in FIG. 10C is an example of a display state of the screen when the media setting tab 1061 is selected.

As illustrated in FIG. 10C, the tab is constituted by a global job media setting part 1066 and a partial job media setting part 1068. The global job media setting part 1066 is provided to select the media to be used for the job. In other words, the example illustrated in FIG. 10C indicates that "Media1" is selected in a global job media type selection part 1067. On the other hand, the partial job media setting part 1068 is used when setting different media for a specific page or range of pages from the media set in the global job media setting part 1066. In the example illustrated in FIG. 10C, a range of pages to be set can be added by a page range adding part 1069. Additionally, a check box 1046 and a page range deletion part 1070 can be used to delete the range of pages to be set by the partial job media setting part 1068.

FIG. 10C illustrates a state in which two page ranges are created. In other words, in a first page range setting part 1071, page 5, pages 200 to 210, and page 250 are set as for a first page range 1073. Here, an example is illustrated in which "Media2 (coated)" is used in a first partial media selection part 1074 for the media to be used for the page that is set.

A second page range setting part 1072 indicates an example of a case where page 1 is set for a second page range 1075 and "Media3 (cardboard)" is used in the second partial media selection part 1076 as the media to be used for the set target page.

Example of JDF

FIGS. 11A to 11E illustrate examples of various types of data to be submitted, which are generated as a result of the customer using and operating each of the operation parts illustrated in FIGS. 10A to 10C. Each data type will be described in detail hereinafter.

FIGS. 11A and 11B illustrate an example of data when JDF is used as the format for the data of the print settings included in the submitted data, which in this case is JDF 1100. "JDF" is data that defines a job, and may correspond to a job ticket.

In FIG. 11A, a creation process list part 1101 is a part that describes, in order, the processes required to create the product. In the example illustrated here, imposition, data analysis, image generation and print processing, as well as varnishing and cutting processing, are listed. As this example shows, the job ticket does not describe processing of performing the inspection. The inspections requested by the customer are described in the quality requirements (described later).

A creation process resource part 1102 is a part that describes the resources used or output by each creation process, and a printing resource part 1103 therein is a part that describes the print data and various types of settings pertaining to printing. Note that the creation process is a process for producing printed materials, which are the products, and may correspond to a job executed by the image forming apparatus 104 or the like. Intermediate products 1104 and 1106 indicate the intermediate products after printing and varnishing, respectively. A final product 1108 indicates the product after all the creation processes are completed. A varnish coating resource 1105 is a part that describes settings for implementing varnish coating processing. The entire paper is specified as the range to be varnished, and the varnish coater is designated as the device to perform the varnish coating. A cutting resource 1107 is a part that describes settings for cutting processing. The finished size, which is the size after cutting, is designated here.

In FIG. 11B, a paper resource part 1109 is a part containing information about the paper to be used. Here, information for the paper designated in the paper settings illustrated FIG. 10C is stored. Three types of paper are designated in the example illustrated here.

A resource-related designation part 1110 is a part describing a relationship between the creation process and the resource. This part indicates the relationship between the process designated in the creation process list part 1101 and the resource designated in the creation process resource part 1102, i.e., which resource corresponds to the input/output of a creation process.

Information on the processing and processes necessary for obtaining the products requested by the customer can be obtained by referring to job instructions (i.e., the JDF 1100). On the other hand, the quality requirements, information pertaining to inspections, and the like necessary for meeting the quality requested by the customer cannot be obtained.

Example of PRX

FIGS. 11C to 11E illustrate an example of PRX data 1110 generated by means of creating or editing PRX, which is the quality requirement data to be submitted. The example illustrated here is constituted by an overall quality information specification part 1111, a color quality information specification part 1112, a defect information specification part 1113, a misalignment quality information specification part 1115, an image/barcode reading quality specification part 1116, and a reference color detail information specification part 1117, which are set in FIG. 10B. In this manner, the requested levels can be set for both the overall quality and the quality of specific items.

Each specification part contains the correspondence between a measurement value and an evaluation level specified in FIG. 10B, the unit of the measurement value, and so on. Furthermore, the defect information specification part 1113 includes a part specifying a defect to be measured, and in the example illustrated here, printing errors are specified as the target of measurement.

Difference Determination Processing

FIG. 12 is a flowchart illustrating the flow of the difference determination processing performed by the workflow control section 707 in step S724.

In step S1201, the workflow control section 707 determines whether submitted data has been provided by the submission system section 706 as a result of the query made in step S722. When it is the first time the submitted data is received, no older version of the submitted data having the same identifier exists, and the data is not provided to the submission system section 706 even when the query is made. In other words, if there is an older version of the submitted data having the same identifier, that data is provided from the submission system section 706. The sequence moves to step S1202 if there is submitted data having the same identifier, i.e., if submitted data is provided by the submission system section 706 in response to the query made in step S722, whereas the flowchart ends if not.

In step S1202, the workflow control section 707 compares the print setting data in the submitted data, and detects a difference as a print setting change point. An example in which JDF is used as the print setting data will be described with reference to FIGS. 14A-1 and 14A-2. The sequence moves to step S1203 once the detection of the print setting change point ends.

In step S1203, the workflow control section 707 compares the quality requirement data of the submitted data having the same ID, and detects a difference as a quality requirement change point. An example in which PRX is used as the quality requirement data will be described with reference to FIGS. 14B to 14D. The sequence moves to step S1204 once the detection of the quality requirement change point ends.

In step S1204, the workflow control section 707 specifies an inspection and an inspection position that will be affected by the print setting change point and the quality requirement change point detected in steps S1202 and S1203, respectively. The inspection effect table, an example of which is illustrated in FIG. 14E, is used to specify these items. Descriptions will be given later with reference to FIGS. 14A to 14D. The flowchart ends once the specifying of the inspection and the inspection position affected by the change points ends. The position to be inspected includes not only coordinates on the sheet, but also a designation of the page.

Quality Report Creation Processing

Figure 13:
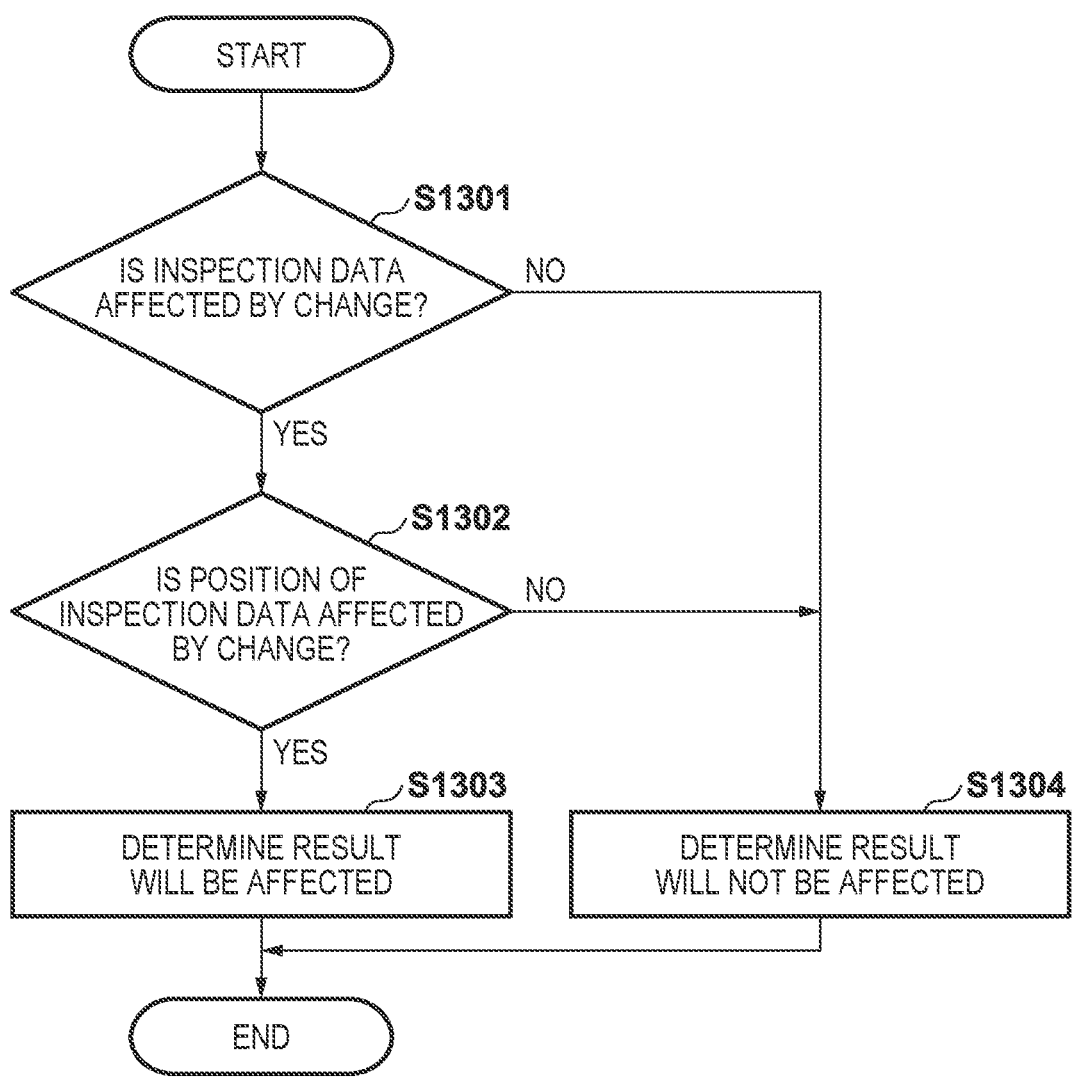
FIG. 13 is a flowchart illustrating the flow of processing by the CPU 301 of the information processing apparatus of the printing business system, performed in effect inspection result determination processing.

FIG. 13 is a flowchart illustrating the flow of the quality report creation processing performed by the workflow control section 707 in step S730. The processing starts upon an inspection result being received from the inspection apparatuses 113 to 116 or the image forming apparatus 104 including the inspection section 904. Note that FIG. 13 assumes that inspection results are not necessarily received all at once. Instead, FIG. 13 is executed each time a result is received.

In step S1301, the workflow control section 707 determines whether the received inspection result is an inspection result pertaining to an inspection item that will be affected by the change points detected in the difference determination processing of step S723. If so, the sequence moves to step S1302, and if not, the sequence moves to step S1304.

In step S1302, the workflow control section 707 determines whether the received inspection result is an inspection result pertaining to an inspection position that will be affected by the change points detected in the difference determination processing of step S723 (i.e., step S1204). If so, the sequence moves to step S1303, and if not, the sequence moves to step S1304. Note that when the received inspection result includes inspection results for a plurality of inspection positions, the determination of step S1302 is performed for the inspection result from each inspection position. The sequence moves to step S1303 for an inspection result from an inspection position that will be affected, and moves to step S1304 when such is not the case.

In step S1303, the workflow control section 707 determines that the inspection result is an inspection result that will be affected by the change point. In this case, the quality report is created so that the inspection result determined to be affected can be distinguished from inspection results determined not to be affected. Because FIG. 13 is a sequence for each received inspection result, the created reports are combined for a single print job (or inspection job) to create a single inspection report. An example of this will be described later with reference to FIG. 15. Once this determination is made, the flowchart ends.

In step S1304, the workflow control section 707 determines that the inspection result is not an inspection result that will be affected by the change point. In this case, in the present embodiment, the quality report need not be created again. The flowchart then ends.

Specific Example of Difference Determination Processing

FIGS. 14A to 14D are schematic diagrams illustrating the difference determination processing performed by the workflow control section 707 in step S723 (or in step S1204 of FIG. 12).

FIGS. 14A-1 and 14A-2 are schematic diagrams illustrating the difference determination processing for the print setting data. JDF is used as an example of the print setting data. Previous version JDF 1401 is an old version of the JDF included in submitted data submitted previously, discovered as a result of the search performed by the submission system section 706 in step S722. On the other hand, updated JDF 1403 is a new version of the JDF included in submitted data which has been newly submitted. The workflow control section 707 compares the print settings in step S1202, and detects a difference. In this example, the settings of ICC profiles 1402 and 1404, which are the color profiles set for page 35, are detected as differences. Because the color profile is a setting for image processing such as color correction, it can be determined, from a difference in the color profile, that there has been a change in the image processing settings, in the examples in FIGS. 14A-1 and 14A-2.

In addition to the image processing functions indicated in this example, the print settings include various print-related specifications such as the paper, apparatuses, and print data used for printing, imposition, and the like. In step S1402, the print settings are compared, and which print settings have been changed for which positions previously is detected at the time of re-submission. In other words, in this example, a change to the image processing function settings for page 35 of the print data is detected.

FIGS. 14B to 14D are schematic diagrams illustrating the difference determination processing for the quality requirement data. Previous version PRX 1410 is an old version of the PRX included in data submitted previously, discovered as a result of the search performed by the submission system section 706 in step S722. On the other hand, updated (new version) PRX 1411 in FIGS. 14C and 14D is the PRX included in the submitted data newly submitted this time. The workflow control section 707 compares the quality requirements in step S1203, and detects a difference. In this example, barcode inspection 1412, specified for position of 133.0, 324.0 on page 102 and added after the update, is detected.

The quality requirements specify various inspection items, such as colorimetric inspection, barcode reading inspection, image defect inspection, image misalignment inspection, and the like, the location where the inspection is to be performed, evaluation criteria for the inspection results, and the like. In step S1203, the quality requirements are compared, and which quality requirements have been changed for which positions previously is detected at the time of re-submission. In other words, in this example, barcode inspections for position of 133.0, 324.0 on page 102 are added. In other words, in this example, the barcode inspection and the position 133.0, 324.0 on page 102 are identified as the inspection item and inspection position that will be affected by the change in the inspection request.

Affected Inspection Table

FIG. 14E is an affected inspection table 1420 to which the workflow control section 707 refers in step S1204. This table indicates which change points in the print setting data and quality requirement data detected in steps S1202 and S1203 will affect the results of the inspection. Change points, data including the change points, and the inspections that will be affected are listed in the table.

In the example in FIGS. 14A-1 and 14A-2, in the new version of JDF, a change to the image processing function settings for page 35 of the print data has been detected, and thus the affected inspection table 1420 is referred to to find that the affected inspection is the colorimetric inspection. Additionally, in the examples in FIGS. 14B to 14D, barcode inspection has been added to the new version of PQX, and thus it is the added barcode scanning that is affected. Likewise, if a color reference image used to evaluate the colorimetric inspection in the quality requirements is changed, the colorimetric inspection will be affected. It can be seen that colorimetric inspection, image misalignment inspection, and defect inspection are required when the apparatuses used for the printing described in the print settings are changed. Although only the items related to printing have been mentioned here for the sake of simplicity, printing companies that handle a wide variety of products perform a variety of processing and decorative treatments. By recording the inspections that are affected by changes in settings, materials, and the like associated with processing and decoration in the affected inspection table 1420, the effect of changes in settings on any processing performed in the manufacturing process can be taken into account.

In FIG. 14E, changes to print settings that affect the inspection results include changes to image processing settings, changes to varnish settings, changes to print data, changes to paper specifications, and changes to the printing apparatus. Meanwhile, changes to quality requirements that affect the inspection results include changes in inspection positions and changes to evaluation criteria, which are not related to inspection items. Furthermore, the inspection items for which changes affect the inspection results include either changing the reference image or adding an inspection.

Example of Quality Report

FIGS. 15A and 15B illustrate an example 1500 of the quality report created in step S731. Information indicating the PQX itself is written in a PQXInfo tag 1501. In addition to the date and ID of creation, RefPRXId, which indicates for which PRX this PQX has been created, and RefPRX-Version, which indicates the version of the PRX, are also written. The example in FIG. 15 pertains to the submitted data including the updated JDF 1403 and updated PRX 1411 in FIGS. 14C and 14D. Accordingly, the same values as those for PRXId and PRXVersion in updated PRX 1511 are listed in RefPRXId and RefPRXVersion.

An affected colorimetric inspection result 1502 and an affected inspection result 1503 are the parts that list the colorimetric inspection result and the barcode inspection result, respectively, described as changed locations with reference to FIGS. 14A to 14D. In step S1301, if the received inspection result is a colorimetric inspection or a barcode inspection result, or these are included in the inspection result, the workflow control section 707 determines that the inspection result will be affected by the change. Additionally, in step S1302, it is determined whether the colorimetric result is that of page 35, which is affected by the change, and whether the inspection result is for the inspection position of the barcode inspection on page 102, at coordinates 133.0, 324.0, which has been added. An inspection results determined to be for an inspection affected by the change and related to the affected inspection position as a result of the determinations in steps S1301 and S1302 are identified in step S1303. The inspection result is then assigned an "Update" attribute, and the value thereof is set to "true", as indicated in the affected colorimetric inspection result 1502 and affected inspection result 1503 illustrated in FIG. 15B. Because this attribute and attribute value are assigned only to the inspection result for an inspection position affected by the change, it is possible to identify which of the inspection results listed in the quality report are results affected by the change in the submitted data. Additionally, because the affected inspection result is identified from the differences between the old and new print settings and quality requirements, results that have changed due to the condition of the apparatuses being used and the like can be excluded. Although the result is distinguished by adding an attribute that indicates that the change has affected the result in the present embodiment, the results may also be distinguished by elements, description areas, etc.

Figure 16:
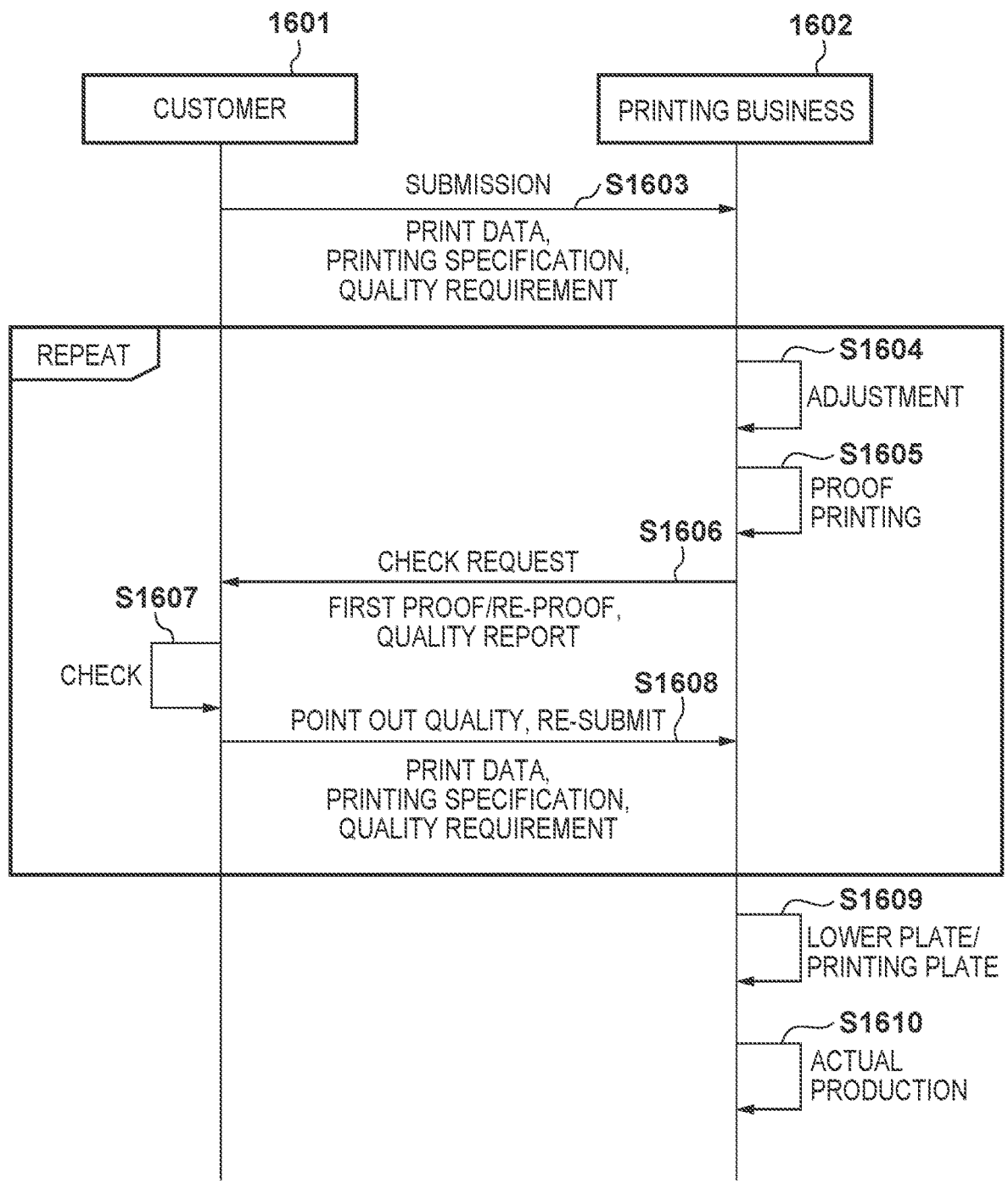
FIG. 16 is a schematic diagram illustrating a situation in which embodiments of the present disclosure are utilized.

FIG. 16 is a diagram illustrating a use case envisioned in the present embodiment. A customer 1601 and a printing business 1602 are called a "buyer" and a "supplier", respectively, and are the party which requests the production of a printed material and the party which actually produces the printed material, respectively.

In step S1603, the customer 1601 passes the data of the printed material to be produced, printing instructions specifying what kind of printed material is to be produced, and the quality requirements specifying what level of quality is required to the printing business as the submitted data. This data is normally managed in association with a purchase order.

In step S1604, the printing business 1602 decides the production date, the apparatuses to be used for production, and the like by referring to the accepted purchase order and submitted data, and by referring to the submitted data, adjusts the apparatuses so as to produce a printed material that meets the quality requirements.

In step S1605, the printing business 1602 performs a confirmation print for the customer 1601 to confirm. This print is known as "proof printing" and the like.

In step S1606, the printing business 1602 passes the confirmation printed material created in step S1605, and a quality report created as a result of inspecting the printed material, to the customer 1601.

In step S1607, the customer 1601 checks the printed material and quality report received in step S1606, and makes corrections to the submitted data. For example, if the color of a specific location is to be changed, a designation of the location and a reference color is added to the quality requirement, or an existing reference color is changed. If the paper being used is to be changed, the print settings are changed.

In step S1608, the customer 1601 once again submits the corrected submitted data to the printing business 1602.

After the printing business 1602 accepts the re-submission in step S1608, the sequence returns to step S1604, where adjustments are made and the confirmation print is performed, and the confirmation printed material and quality report are then created in step S1606. In the present embodiment, the quality report created at the time of re-submission is created such that the inspection result affected by the change made by the customer 1601 can be distinguished from other inspection results. This output makes it easier for the customer 1601 to perform the confirmation in step S1607. Here, for example, when displaying the quality report in the information processing apparatus 110 of the customer system 109, the inspection result for which the attribute value of the "Update" tag is "true" may be made visually distinguishable from the other inspection results, to make it particularly easy to identify the inspection result. For example, a different color from the others may be used, the content may be inverted or flashing, or the like. Similarly, when printing, a different color from the others may be used, the content may be inverted or made bold, a mark may be printed outside a column, or the like. Furthermore, a quality report may be created that includes only inspection results for which the attribute value of the "Update" tag is "true".

Once the adjustments are complete, for offset printing, a printing plate is created in step S1609, and the actual production is performed in step S1610. In principle, it is not possible to change the submitted data after step S1609. It is therefore necessary for the customer 1601 to complete the confirmation by this point.

As described thus far, the quality report creation system according to the present embodiment compares quality requirements and print settings included in submitted data which has been re-submitted with older versions of the same, detects a difference as a change point, and creates a quality report that makes it possible to identify a quality item affected by the change.

Second Embodiment

In the first embodiment, the quality report was created such that a result affected by a change made to the print settings and the quality requirements in submitted data can be distinguished. This is because the first embodiment assumes that the image forming apparatus 104 is designated for all of the inspections, even during reprinting, in order to carry out the inspections. On the other hand, if a large number of offline or near-line inspection apparatuses are used, it will take a long time to perform all inspections that are not affected by changes. If the items of interest are only inspection results which are affected by changes, it is only necessary to perform inspections that are affected by changes. The present embodiment will describe a system that makes quality reports efficiently by identifying an inspection and an inspection position affected by a change and then instructing only that inspection to be performed. "Offline" refers to a state of not being connected by communication, and "near-line" refers to a state of being connected to the information processing apparatus 103 by communication, but in which a printed output material cannot be processed in-line. Accordingly, in either case, it is necessary for the operator to move intermediate products from the previous process to the respective inspection apparatuses and instruct the apparatuses to execute the job.

Figure 17:
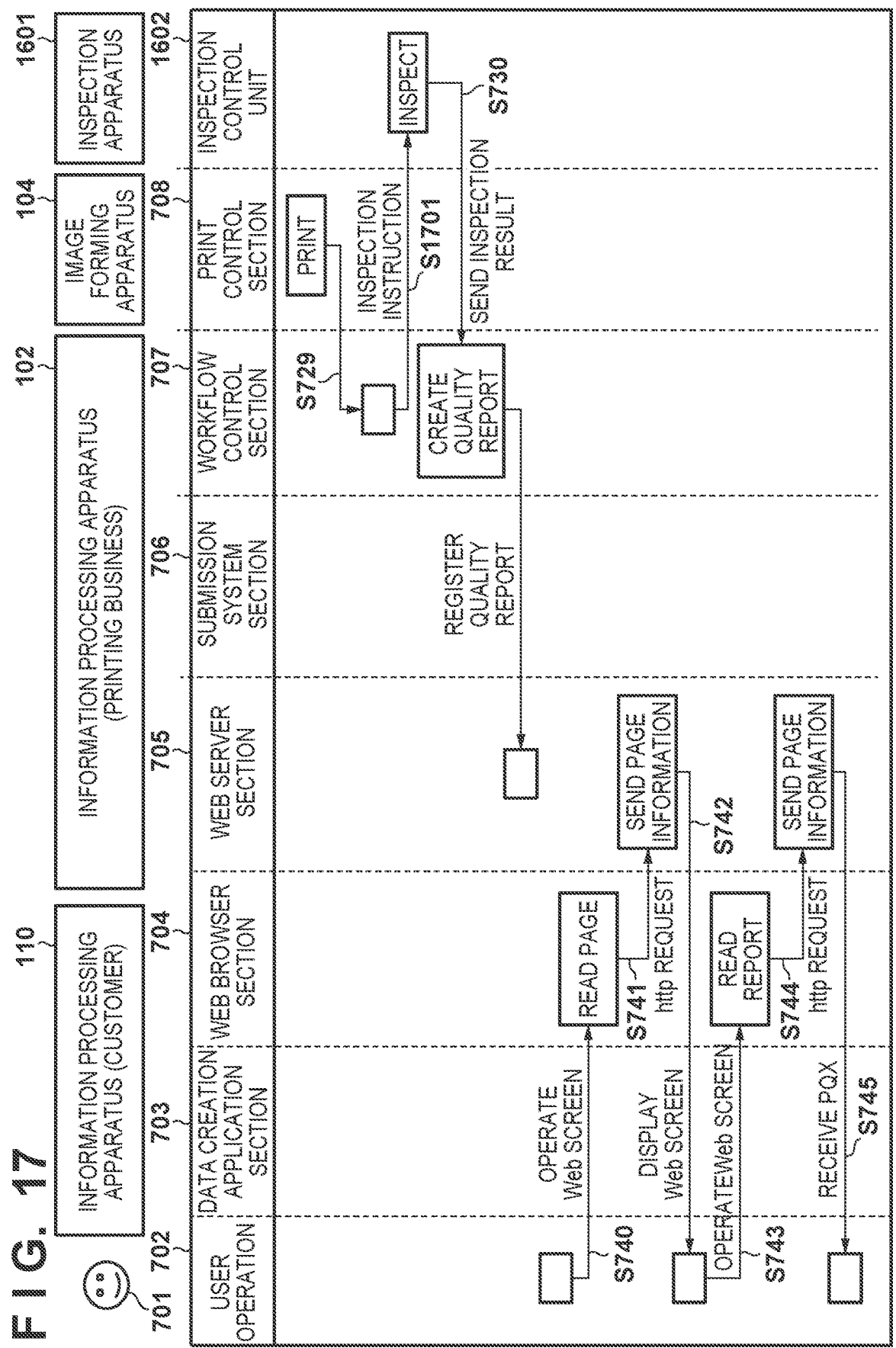
FIG. 17 is a system flowchart illustrating the processing flow of the print processing system as a whole, according to a second embodiment.

The present embodiment assumes that the inspection apparatuses are not linked to a printer, a processing machine, or the like. FIG. 17 illustrates a system flow from the submission of print data for reprinting to the presenting of a quality report. Because the first half of FIG. 17 (steps S709 to S728) is the same as in FIGS. 7A and 7B, the following descriptions will refer to FIGS. 7A and 7B, and the second half (steps S729 to S745) is illustrated in FIG. 17.

Once the printing ends (step S729), in step S1701 of FIG. 17, the workflow control section 707 specifies each inspection apparatus to perform an inspection, as well as specifying at least the position to inspect. The flow of this processing will be described with reference to FIG. 18.

Figure 18:
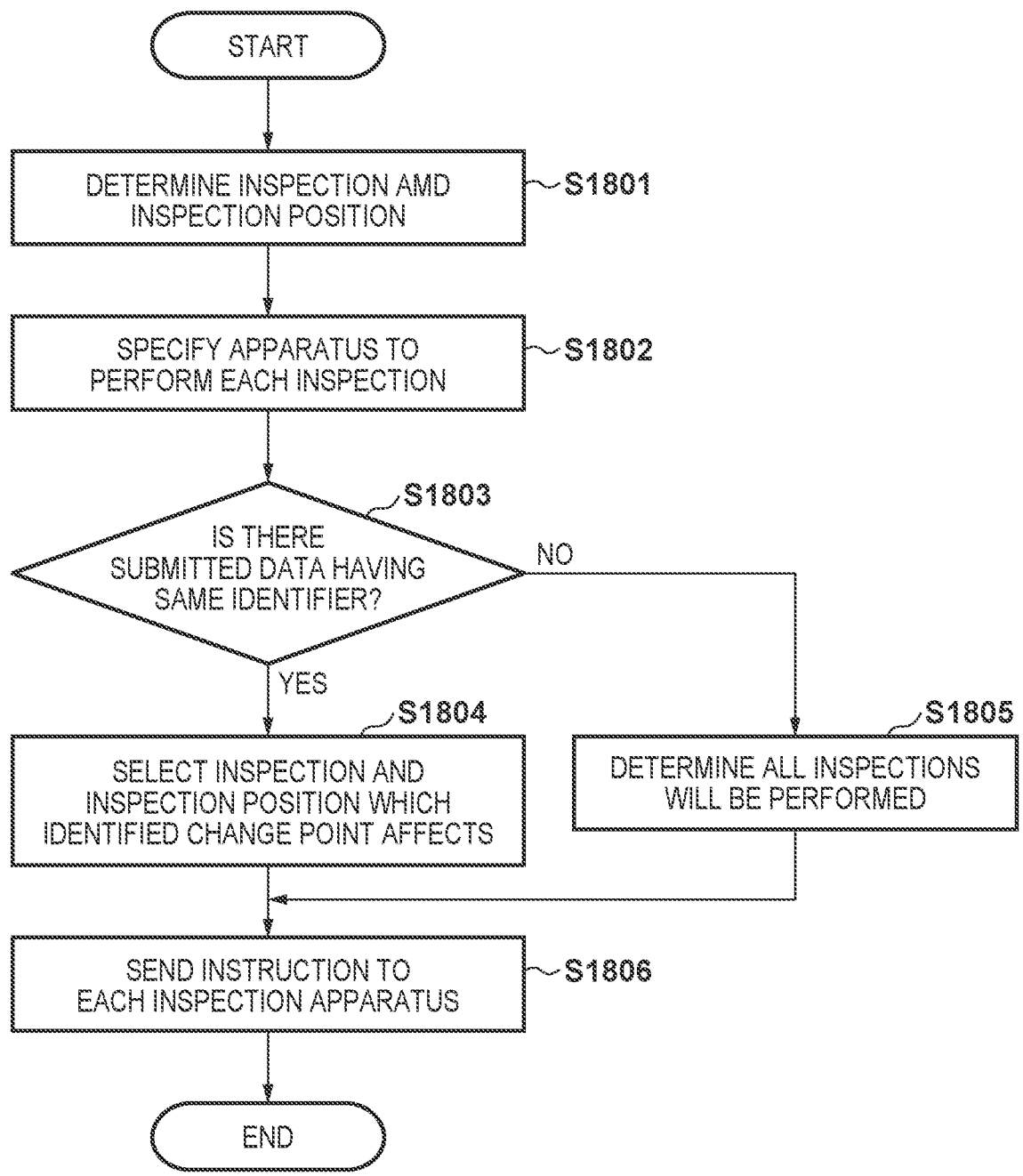
FIG. 18 is a flowchart illustrating the flow of processing by the CPU 301 of the information processing apparatus of the printing business system, performed in executed inspection determination processing.

FIG. 18 is a flowchart illustrating the flow of processing for determining the inspection and the inspection position specified by the workflow control section 707 in step S1701.

In step S1801, the workflow control section 707 determines the inspection to be performed and the inspection position from the quality requirements (PRX).

In step S1802, the workflow control section 707 determines the apparatus to perform the inspection in step S1801, and the instruction format for the apparatus, on the basis of the inspection apparatuses associated with the respective inspections. The apparatus and the instruction format are handled using a process-apparatus correspondence table 2000, in which correspondence relationships are stored. The process-apparatus correspondence table 2000 is illustrated in FIG. 20.

In step S1803, the workflow control section 707 determines whether there was (i.e., received) submitted data including a quality requirement having the same identifier in step S723. The sequence moves to step S1804 if such submitted data has been received, and to step S1805 if not.

In step S1804, the workflow control section 707 selects (or identifies), as the inspection to be performed and the inspection target, the inspection and the inspection position identified in step S1204 of the difference determination processing S724 from the inspection and the inspection position determined in step S1801. The inspection and the inspection position identified in step S1204 of the difference determination processing S724 are the inspection affected by change points in the print settings and the quality requirements, and the inspection position. Then, the selected inspection and inspection position are stored in association with each other. The process then moves to step S1806. The identification of the inspection item and inspection position in S1804 may be performed through the sequence illustrated in FIG. 13.

In step S1805, the workflow control section 707 determines that all the inspections and inspection positions determined in step S1801 are to be inspected. In accordance with this determination, for example, the inspection to be performed and the inspection position are stored in association with each other. The sequence moves to step S1806 after step S1805.

In step S1806, the workflow control section 707 instructs the inspection to be performed according to the inspection and the inspection position determined in step S1804 or step S1805. The instructions are issued to the inspection apparatuses determined in step S1802 for each inspection and inspection position.

The instruction for the inspection performed in step S1806 may be issued by the workflow control section 707 directly to the inspection apparatus over a connection such as a network, or by outputting (issuing) a task process chart that inputs the inspection details to the inspection apparatus, as illustrated in FIG. 19.

FIG. 19 illustrates the task process chart created and output by the workflow control section 707. In the present embodiment, the inspection apparatus which is used is, for example, a near-line device, and the workflow control section 707 prints the task process chart, indicating the tasks to be executed, in order to use the near-line device. An operator can read a barcode corresponding to each process using the device for each process or, in the case of manual operation, a personal computer or the like. The barcode contains identification information and the like unique to the job, and the device that reads the barcode obtains the necessary information (e.g., a job ticket describing requirements and the like) from the workflow control section 707 and executes the processing. The information may include, for example, the position to be inspected and the like. This is, of course, only one example, and the necessary information may be included in the barcode, for example.

In FIG. 19, a task process chart 1900 created on the basis of a previous version of the submitted data and a task process chart 1919 created on the basis of the post-change submitted data are arranged side-by-side for comparison. In both task process charts, the inspection details can be input by having the inspection apparatus read the barcode of each process listed in each of task details 1901 and 1921.

The task process chart 1900 created on the basis of the previous version of the submitted data is a task process chart which has been determined to not have submitted data having the same identifier in step S1803 and in which all inspections specified in the quality requirements are printed. In other words, this chart is a task process chart issued at a first trial printing. The task processes includes ten processes: printing 1902, register misalignment inspection 1903, print inspection 1904, varnish coating 1905, cutting 1906, colorimetric inspection 1907, packing 1908, transportation 1909, shipping 1910, and completion confirmation 1911.

In the task process chart 1919 created on the basis of the post-change submitted data, it is determined that there is submitted data having the same identifier in step S1803, and only the inspections and inspection positions having change points are included in the task processes. In other words, register misalignment inspection 1903 and print inspection 1904, which are not affected by the change points, are excluded from the processes, and the inspection position for colorimetric inspection 1925 is only for inspecting areas affected by the changes. The inspection position for colorimetry can be input into the inspection apparatus by reading a barcode. Barcode inspection 1926 which was added to the quality requirements after the change has also been added to the task process chart.

By causing the inspection apparatuses to read the barcodes in accordance with this task process chart, the operator performing the printing can perform inspections only for inspections and inspection positions that will be affected by the changes.

FIG. 20 is an example of the process-apparatus correspondence table 2000 storing the apparatuses for which the workflow control section 707 issues instructions in steps S728 and S1701, and instruction methods. The processes for generating printed materials, the implementing apparatuses that implement the processes, and the instruction format for the implementing apparatuses are stored in association with each other. In the process of creating and inspecting a printed material, once the processes and inspections to be performed have been determined, the workflow control section 707 refers to the process-apparatus correspondence table 2000, which is stored in the RAM 302. Once the apparatuses to be used and the instruction format for each process and each inspection have been determined by referring to the process-apparatus correspondence table 2000, instructions are created using the determined instruction format. The task process chart illustrated in FIGS. 19A and 19B is an example of instructions made when the instruction format is a manual. An inspection apparatus which uses JDF as the instruction format can also perform inspections by selecting the job corresponding to the inspection to be performed from the user interface of the system and instructing its execution, without reading the barcode.

The first embodiment described the flow of processing for creating a quality report, performed by the workflow control section 707 in step S730, with reference to FIG. 13. As opposed to this, in the second embodiment, the inspection apparatus only performs inspections for the inspections and inspection positions that are affected by the changes, and thus the quality reports are also limited to only the items inspected. As such, the determination of the inspection data is not necessary when creating the quality report.

As described above, when the print settings, the quality requirements, and the like have been changed for a single printed product, when re-printing after the change, only quality inspections which will be affected by the change need be executed. This eliminates the work of repeating quality inspections and improves the productivity. Furthermore, because the quality report includes only the inspection results affected by the change, it is easier to check the details, which also contributes to increased productivity. This can reduce the amount of work required by the operator for inspections especially when the inspection devices are offline or in-line, which contributes to a reduction in reprinting and inspection time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-100276, filed Jun. 9, 2020, which is hereby incorporated by reference herein in its entirety.

What is claimed is:

1. An information processing apparatus configured to, on the basis of submitted data, generate a quality report for a printed material inspected by an inspection apparatus, the information processing apparatus comprising:
at least one processor; and
at least one memory,
wherein when a program stored in the at least one memory is executed by the at least one processor, the program causes the at least one processor to function as:
a first specifying unit that, when the submitted data is a new version and an old version of the submitted data is present, specifies a difference by comparing the new version of the submitted data with the old version of the submitted data;
a second specifying unit that, on the basis of the difference, specifies an inspection for which an inspection result will be affected by the difference; and
a creation unit that creates a quality report which makes it possible to distinguish, among inspection results received from the inspection apparatus, an inspection result for the inspection that will be affected from another inspection result.

2. The information processing apparatus according to claim 1,
wherein the creation unit creates the quality report in such a manner that the inspection result for the inspection that will be affected can be displayed so as to be visually distinguishable from the other inspection result.

3. The information processing apparatus according to claim 1,
wherein the creation unit creates the quality report so as to include the inspection result for the inspection that will be affected and not include the other inspection result.

4. The information processing apparatus according to claim 1,
wherein the second specifying unit specifies an inspection item and an inspection position of the inspection that will be affected by the difference as the inspection that will be affected, and
wherein the creation unit creates the quality report in such a manner that an inspection result for the inspection item and the inspection position that have been specified can be distinguished from the other inspection result as the inspection result of the inspection that is affected.

5. The information processing apparatus according to claim 1,
wherein the submitted data includes a print setting and a quality requirement,
wherein the first specifying unit specifies the difference for each of the print setting and the quality requirement, and
wherein the second specifying unit specifies an inspection that will be affected by a difference in at least one of the print setting and the quality requirement.

6. The information processing apparatus according to claim 5,
wherein a change to the print setting that will affect the inspection result includes one of a change to a color processing setting, a change to a varnish setting, a change to print data, a change to a paper designation, and a change to a printing apparatus.

7. The information processing apparatus according to claim 5,
wherein a change to the quality requirement that will affect the inspection result includes one of a change to the inspection position, a change to an evaluation criterion, a change to a reference image, and an addition of an inspection.

8. The information processing apparatus according to claim 5, wherein the quality requirement is written in Print Quality eXchange (PQX).

9. An information processing apparatus configured to issue an instruction to inspect a printed material to an inspection apparatus on the basis of submitted data, the information processing apparatus comprising:
    at least one processor; and
    at least one memory,
    wherein when a program stored in the at least one memory is executed by the at least one processor, the program causes the at least one processor to function as:
    a first specifying unit that, when the submitted data is a new version and an old version of the submitted data is present, specifies a difference by comparing the new version of the submitted data with the old version of the submitted data;
    a second specifying unit that, on the basis of the difference, specifies an inspection for which an inspection result will be affected by the difference; and
    an issuing unit that issues an instruction for inspection to the inspection apparatus performing the inspection that will be affected.

10. A non-transitory computer-readable medium storing a program including instructions, which when executed by one or more processors of an information processing apparatus, which is configured to generate a quality report for a printed material inspected by an inspection apparatus on the basis of submitted data, cause the information processing apparatus to:
    when the submitted data is a new version and an old version of the submitted data is present, specify a difference by comparing the new version of the submitted data with the old version of the submitted data;
    specify, on the basis of the difference, an inspection for which an inspection result will be affected by the difference; and
    create a quality report which makes it possible to distinguish, among inspection results received from the inspection apparatus, an inspection result for the inspection that will be affected from another inspection result.

11. A non-transitory computer-readable medium storing a program including instructions, which when executed by one or more processors of an information processing apparatus, which is configured to issue an instruction to inspect a printed material to an inspection apparatus on the basis of submitted data, cause the information processing apparatus to:
    when the submitted data is a new version and an old version of the submitted data is present, specify a difference by comparing the new version of the submitted data with the old version of the submitted data;
    specify, on the basis of the difference, an inspection for which an inspection result will be affected by the difference; and
    issue an instruction for inspection to the inspection apparatus performing the inspection that will be affected.

12. A method of generating, on the basis of submitted data, a quality report for a printed material inspected by an inspection apparatus, the method comprising:
    when the submitted data is a new version and an old version of the submitted data is present, specifying a difference by comparing the new version of the submitted data with the old version of the submitted data;
    specifying, on the basis of the difference, an inspection that will be affected by the difference; and
    creating a quality report which makes it possible to distinguish, among inspection results received from the inspection apparatus, an inspection result for the inspection that will be affected from another inspection result.

13. A method of issuing an instruction to inspect a printed material to an inspection apparatus on the basis of submitted data, the method comprising:
    when the submitted data is a new version and an old version of the submitted data is present, specifying a difference by comparing the new version of the submitted data with the old version of the submitted data;
    specifying, on the basis of the difference, an inspection that will be affected by the difference; and
    issuing an instruction for inspection to the inspection apparatus performing the inspection that will be affected.

* * * * *